United States Patent [19]
Kim et al.

[11] Patent Number: 5,867,470
[45] Date of Patent: *Feb. 2, 1999

[54] DISK RECORDING/REPRODUCING APPARATUS HAVING TWO TRAYS SO THAT A DISK IN A MAGAZINE CAN BE REPLACED BY ONE TRAY WHEN A DISK IN THE OTHER TRAY IS BEING RECORDED/REPRODUCED

[75] Inventors: Young-Taek Kim, Suwon; Cheol-Woong Ahn, Seoul, both of Rep. of Korea

[73] Assignee: Samsung Electronics Co., Ltd., Kyungki-do, Rep. of Korea

[*] Notice: The term of this patent shall not extend beyond the expiration date of Pat. No. 5,715,229.

[21] Appl. No.: 685,915

[22] Filed: Jul. 22, 1996

[30] Foreign Application Priority Data

Oct. 31, 1995 [KR] Rep. of Korea .................. 1995 39051

[51] Int. Cl.⁶ .......................... G11B 17/04; G11B 17/10; G11B 33/04
[52] U.S. Cl. .......................... 369/178; 369/75.2; 369/192

[58] Field of Search .................................. 369/75.1, 75.2, 369/77.1, 77.2, 36, 178, 192; 360/92, 94, 98.01, 98.04

[56] References Cited

U.S. PATENT DOCUMENTS

| | | | |
|---|---|---|---|
| 4,949,328 | 8/1990 | Kase et al. | 369/75.2 |
| 5,146,446 | 9/1992 | Ota et al. | 369/77.2 |
| 5,226,032 | 7/1993 | Ikedo et al. | 369/178 |
| 5,327,412 | 7/1994 | Lee | 369/178 |
| 5,384,760 | 1/1995 | Kumakura | 369/38 |
| 5,615,197 | 3/1997 | Choi | 369/77.2 |

*Primary Examiner*—George J. Letscher
*Attorney, Agent, or Firm*—Sughrue, Mion, Zinn, Macpeak & Seas, PLLC

[57] ABSTRACT

A disk recording/reproducing apparatus includes a stacked pair of trays each having a disk seating unit thereon and a magazine containing a plurality of disks. While a disk seated in one tray is being recorded on or reproduced from, a disk within a magazine can be removed and replaced by the other tray.

6 Claims, 19 Drawing Sheets

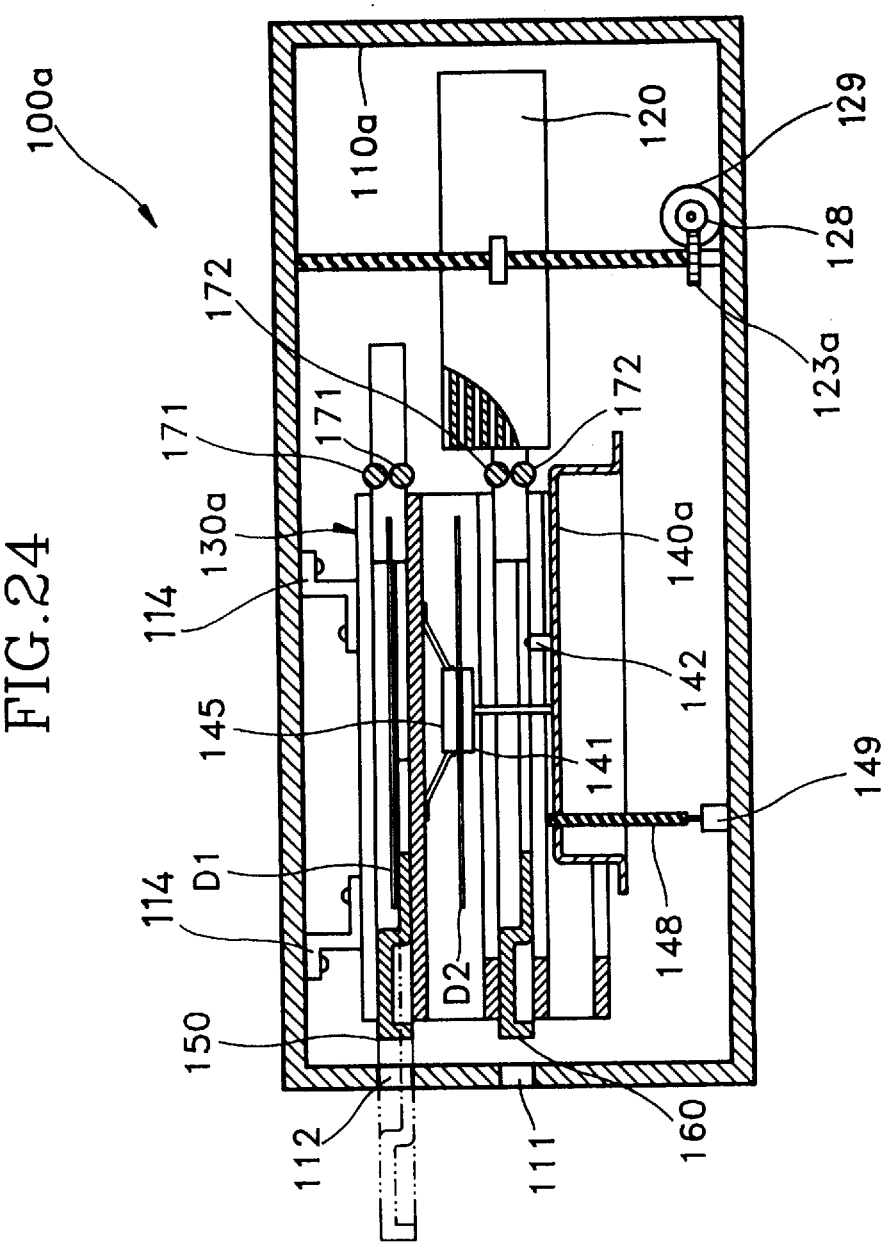

DISK RECORDING/REPRODUCING APPARATUS HAVING TWO TRAYS SO THAT A DISK IN A MAGAZINE CAN BE REPLACED BY ONE TRAY WHEN A DISK IN THE OTHER TRAY IS BEING RECORDED/REPRODUCED

BACKGROUND OF THE INVENTION

1. Field of the Invention

The present invention relates to a disk recording/reproducing apparatus, and more particularly, to a disk recording/reproducing apparatus having a disk changer, for accommodating a plurality of disks, which is capable of changing disks while a disk is being reproduced.

2. Description of the Related Art

A disk recording/reproducing apparatus capable of recording/reproducing from a plurality of disks has some form of disk changer. In general, the disk changer can be classified as one of a roulette type, a fixed magazine type, and an elevator type. The roulette-type disk changer selects a disk from a rotating tray of circularly arranged disks on a turntable similar to a roulette wheel. The fixed magazine type disk changer selects a disk by extracting one disk from a stack of disks stored in slots of a magazine cassette. The elevator-type disk changer stores disks in the same manner as the fixed magazine type but selects a disk by moving the magazine cassette up and down to then position the selected disk for reading or recording by an optical pickup.

In a disk recording/reproducing apparatus having a disk changer, a plurality of disks can be individually selected and reproduced rapidly for hours of uninterrupted play without having to manually change disks. However, when a user wishes to play an external disk which is not already loaded in the disk changer the play operation must be halted and the user must replace a disk in the disk changer with the external disk causing a break in the continuous reproduction of music or the like recorded on the disks.

FIG. 1 is a cross-sectional view of a conventional elevator-type disk recording/reproducing apparatus. In this apparatus, a disk reproducing unit 30 is positioned behind openings 33, near the front of the apparatus, and a disk storage 20 accommodating a plurality of subtrays 23a through 23f is positioned in the rear of the apparatus. The plurality of the subtrays 23a through 23f each can accommodate one disk. However, one subtray 23a among the plurality of the subtrays 23a through 23f is left unoccupied.

A clamp arm 64, to which a clamp 71 for clamping a disk to a turntable is supported, is installed in the upper portion of the disk reproducing unit 30. A main tray 31 for housing the subtrays 23a through 23f is slidably installed between the clamp 71 and the disk reproducing unit 30. The plurality of subtrays 23a through 23f are movable from the disk storage 20 to the main tray 31 by means of rollers 91 and 92.

The elevator-type disk recording/reproducing apparatus operates as follows. When reproducing a disk that is not stored in the disk storage 20, the empty subtray 23a is moved to the main tray 31 by means of the driving rollers 91 and 92 and is projected outside the body of the apparatus via the openings 33 together with the main tray 31, allowing a desired disk for reproduction to be set in the subtray 23a. Thereafter, the main tray 31 and subtray 23a are transferred to a disk reproducing position, then, the subtray 23a is lowered by a predetermined operating means to seat the disk on a turntable. Subsequently, the clamp arm 64 descends to secure the disk to the turntable with clamp 71.

In the conventional disk recording/reproducing apparatus, since at least one subtray is left unoccupied, an external disk can be accommodated in the empty subtray. However, in such a conventional disk recording/reproducing apparatus, the reproduction/recording of a disk must be stopped for replacement of a disk among those in the subtrays, since an external disk cannot be exchanged with a disk accommodated in the subtray during disk reproduction.

SUMMARY OF THE INVENTION

To solve the problems of the conventional device noted above, it is an object of the present invention to provide a disk recording/reproducing apparatus, having a magazine accommodating a plurality of disks, which can exchange a disk accommodated in the magazine with an external disk during a disk reproducing operation.

To accomplish the above object, there is provided a disk recording/reproducing apparatus including: a housing having at least one disk entrance formed in its front wall, a magazine having a stack of disk receivers installed at the rear of the housing, means for elevating the magazine, a subtray and a deck each installed inside the housing between the disk entrance and the magazine, the subtray and the deck being relatively movable toward and away from each other, means for moving the subtray and deck relatively, a first tray having a first disk seating unit on the upper portion thereof and installed on the subtray to be movable horizontally with respect to the housing, means for transferring the first tray horizontally, a first transferring means for placing the disk in the magazine onto the first disk seating unit or moving the disk from the first disk seating unit into the magazine, a second tray having a second disk seating unit on the upper portion thereof and supported by the subtray between the deck and the first tray, a second transferring means for placing the disk in the magazine onto the second disk seating unit or moving the disk from the second disk seating unit into the magazine, a turntable installed on the deck and extending from the second disk seating unit, during the relative movement of the subtray and the deck toward each other, so that the turntable raises the disk from the second disk seating unit thereonto, and an optical pickup installed on the deck, wherein the first tray is positioned at the same height as one of the disk entrances so as to be insertable into/extractable from the disk entrance by the first tray transferring means while the deck records/reproduces information onto/from a disk on the second tray.

BRIEF DESCRIPTION OF THE DRAWINGS

The above objects and advantages of the present invention will become more apparent by describing in detail preferred embodiments thereof with reference to the attached drawings in which:

FIG. 24 is a structural plan view of the deck in a lowered state in the recording/reproducing apparatus shown in FIG. 23.

DETAILED DESCRIPTION OF THE PREFERRED EMBODIMENTS

Figure 1:
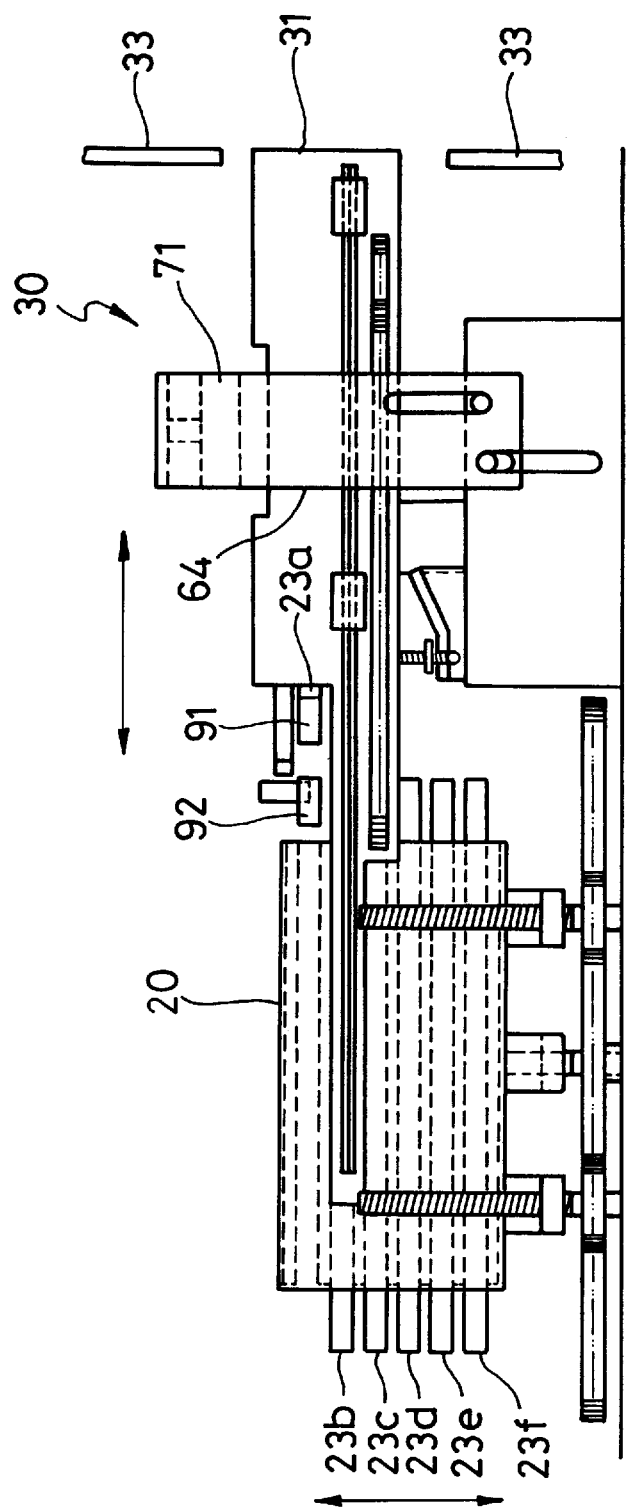
FIG. 1 is a schematic diagram of a conventional elevator magazine-type disk recording/reproducing apparatus.

Referring to FIGS. 2 through 7, the first preferred embodiment of the disk recording/reproducing apparatus 100 has a disk entrance 111 formed in a front wall thereof so that a disk can be inserted into and ejected from the inside of a housing 110. A magazine 120, having multilayer disk receivers 121 disposed therein for receiving a plurality of disks, is provided inside the housing 110 at a rear portion of the housing 110. The magazine 120 is screw-coupled to a screw stock 122 which is rotatably connected to the housing 110. The magazine 120 is also connected to a guide stock 122a and moves up or down along the guide stock 122a as the screw stock 122 is rotated.

Figure 3:
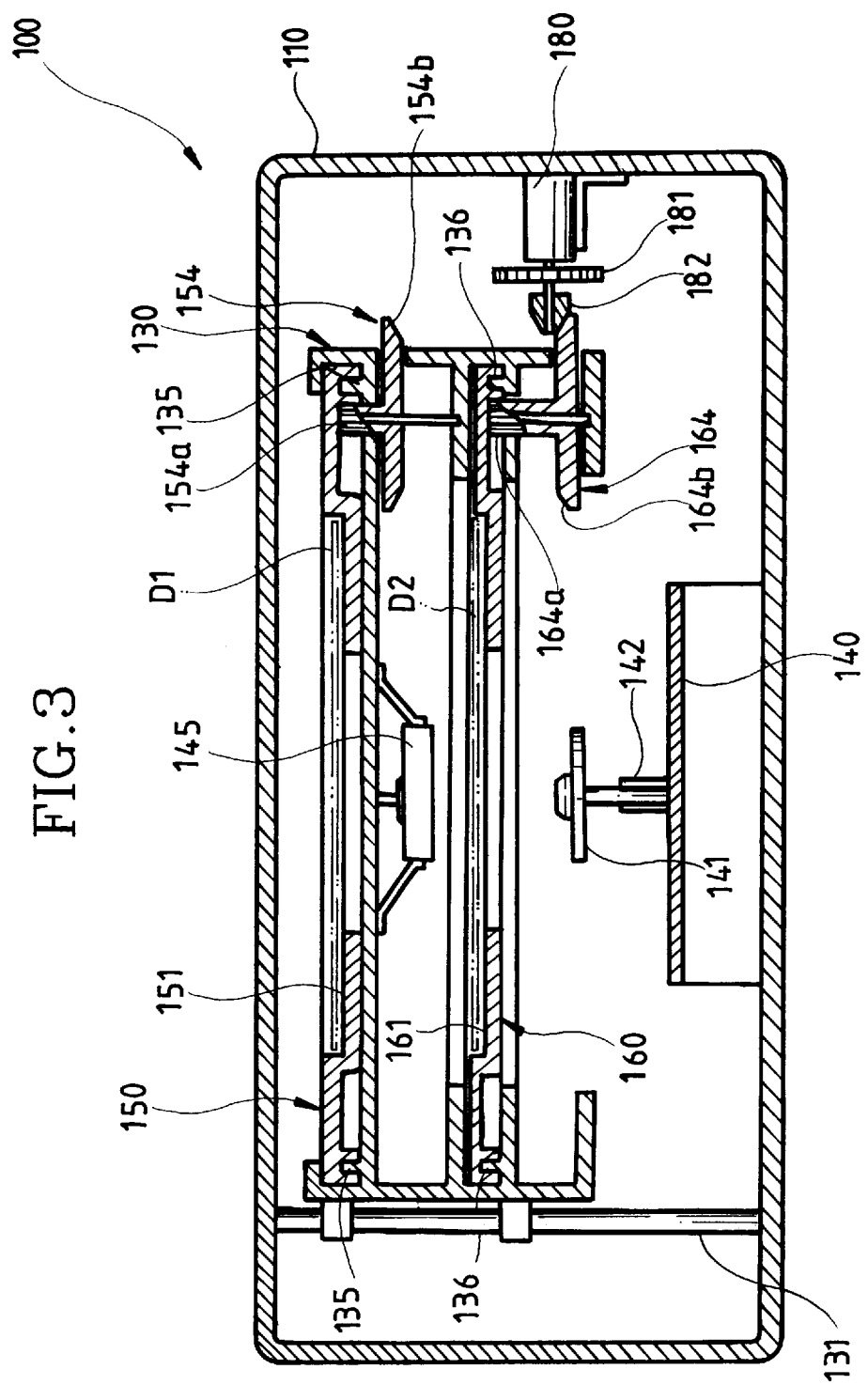
FIG. 3 is a sectional view taken along the line III—III of FIG. 2.

As is best illustrated in FIG. 3, a subtray 130 and a deck 140 are installed between the disk entrance 111 and the magazine 120. The subtray 130 is movably installed on guide stocks 131 and the deck 140 is fixed at the bottom of the housing 110.

Figure 5:
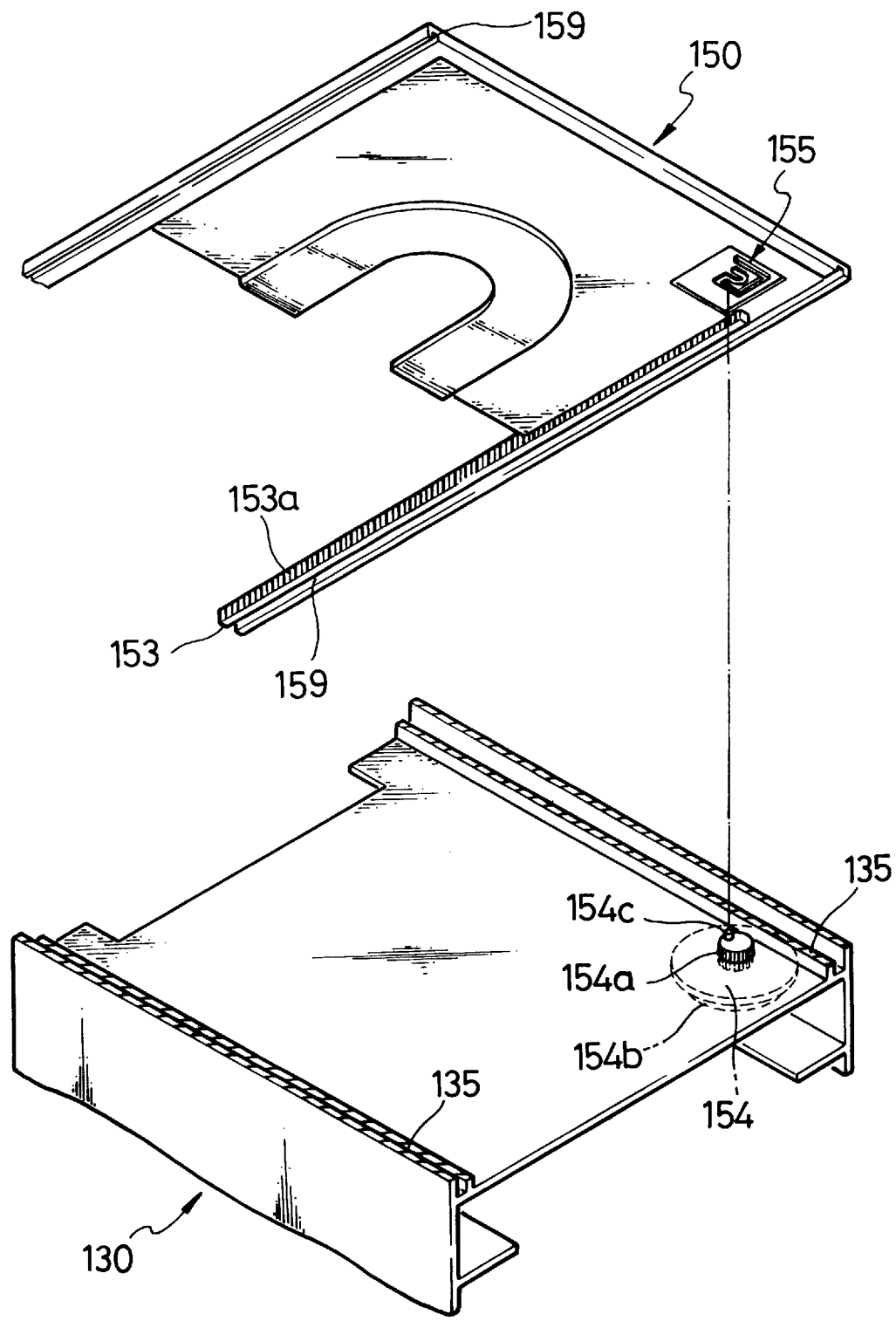
FIG. 5 is an exploded perspective view of the first tray and the subtray shown in FIG. 2.
Figure 6:
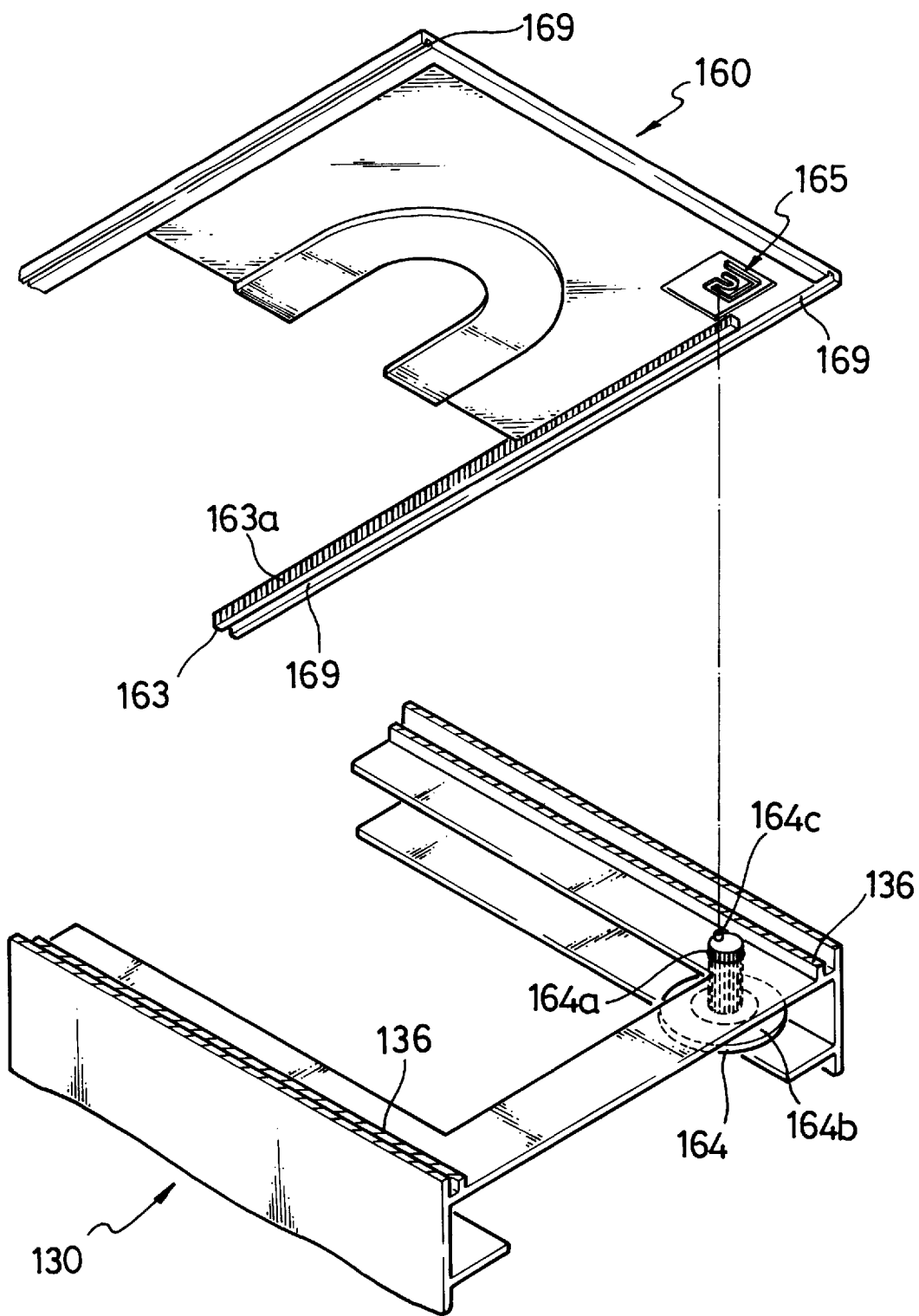
FIG. 6 is an exploded perspective view of the second tray and the subtray shown in FIG. 2.

A first tray 150 is supported in the upper portion of the subtray 130 and a second tray 160 is supported in the lower portion of the subtray 130 between the first tray 150 and the deck 140. The first tray 150 and second tray 160 are vertically spaced from each other by the elevating distance of the subtray 130. The second tray 160 is positioned at the same height as that of the disk entrance 111 when the subtray 130 is in a raised state, and the first tray 150 is positioned at the height of the disk entrance 111 when the subtray 130 is in a lowered state. A disk seating unit 151 in which a disk D1 is seated is formed on top of the first tray 150, and a parallel pair of guiding units 152 and 153 (see FIG. 2) which extend to the back of the housing are installed at both sides of the first tray 150. As shown in FIG. 5, guide grooves 159 are formed in the bottoms of the respective guiding units 152 and 153. Each guide groove 159 slidably connects to a pair of guide rails 135 formed at the sides of the subtray 130 beneath the first tray 150. Thus, the first tray 150 can move forward and backward with respect to the housing 110 on the subtray 130.

Figure 12:
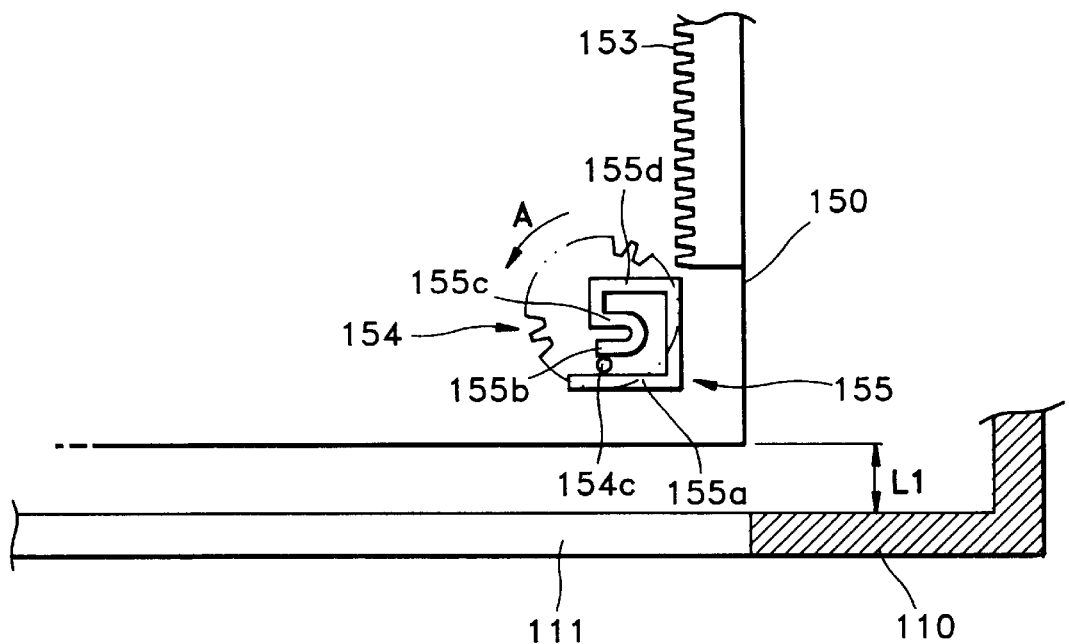
FIGS. 12 through 14 are structural plan views of important portions, sequentially showing the positional relationship between a locking rib of the first tray and a connecting protrusion of a first rotator when the first tray is transferred from a first position to a second position.

A rack 153a is formed on the inner side of the guiding unit 153 and extends from the leading edge of the guiding unit 153 to a position adjacent to a locking rib 155 at the other end thereof. As shown in FIG. 12, the locking rib 155 protruding from the bottom of the first tray 150 has a first wall 155a, a second wall 155b, a third wall 155c and a fourth wall 155d, spaced apart from the front edge of the first tray 150. The locking rib 155 constitutes means for transferring the first tray 150 to the front and rear of the housing, in combination with the rack 153a, a tray driving motor 180 (to be described later) and a first rotator 154 (to be described later).

The second tray 160 has the same configuration as that of the first tray 150. In other words, there is a disk seating unit 161 formed on the upper portion of the second tray 160 onto which a disk D2 can be placed. The second tray 160 is movable horizontally forward and backward with respect to the housing 110, by connecting guide grooves 169 formed at the bottoms of the respective guiding units 162 and 163. The guide grooves 169 are slidably connected to a pair of guide rails 136 formed at the sides of the subtray 130 beneath the second tray 160. Also, the second tray 160 has a rack 163a and a locking rib 165, each having the same configuration as the corresponding elements of the first tray 150. The locking rib 165 constitutes means for transferring the second tray 160 to the front and rear of the housing 110, in combination with the rack 163a, the tray driving motor 180 and a second rotator 164 (to be described later).

Referring to FIGS. 3 and 5, a first rotator 154 is rotatably installed at one end of the subtray 130. A gear 154a is engaged with the rack 153a of the first tray 150 and is formed on the first rotator 154, and a coupling protrusion 154c protrudes from a peripheral portion of an upper surface of the gear 154a. The rotation diameter of the coupling protrusion 154c is set to be larger than the interval between the first wall 155a and the fourth wall 155d of the locking rib 155 formed underneath the first tray 150. A conical friction unit 154b is formed on the lower surface of the first rotator 154.

The second rotator 164 having a gear 164a, a coupling protrusion 164c and a conical friction unit 164b, similar to the first rotator 154, is rotatably installed in the lower portion of the subtray 130. The gear 164a of the second rotator 164 is engaged with the rack 163a of the second tray 160.

The friction unit 154b of the first rotator 154 and the friction unit 164b of the second rotator 164 are installed so that they face each other. The respective friction units 154b and 164b protrude slightly outside the subtray 130 through a sidewall of the subtray 130.

Figure 7:
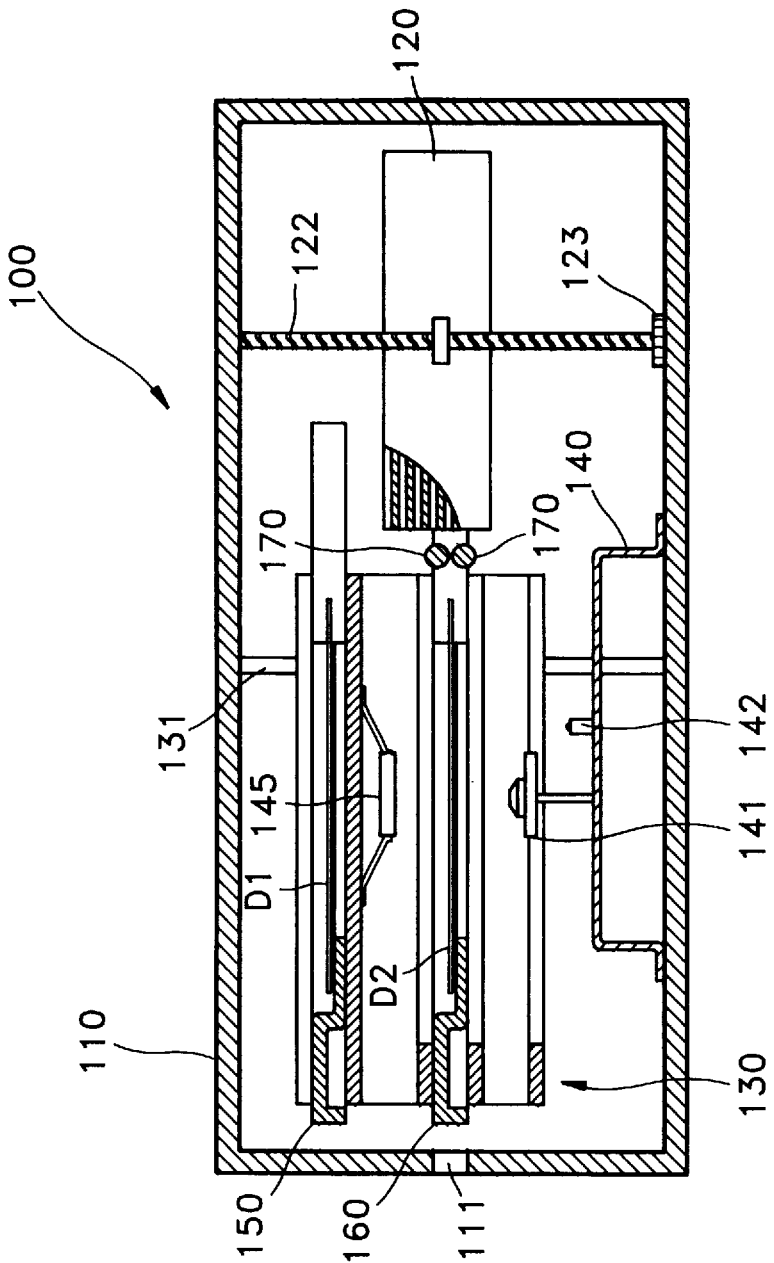
FIG. 7 is a sectional view taken along the line VII—VII of FIG. 2.

Known disk recording/reproducing elements such as a turntable 141 for disk rotation and an optical pickup 142 for light beam emission are installed in the deck 140. When the subtray 130 is lowered, the disk D2 seated in the disk seating unit 160 of the second tray 160 is transferred to and supported by the turntable 141 which protrudes slightly above the disk seating unit 161 when subtray 130 is in a fully lowered position. Referring to FIG. 7, a clamp 145 is installed between the first tray 150 and second tray 160 of the subtray 130. When the subtray 130 is lowered, the clamp 145 applies pressure to the top of the disk D2 supported on the turntable 141 to prevent wobbling of the disk D2.

Figure 4:
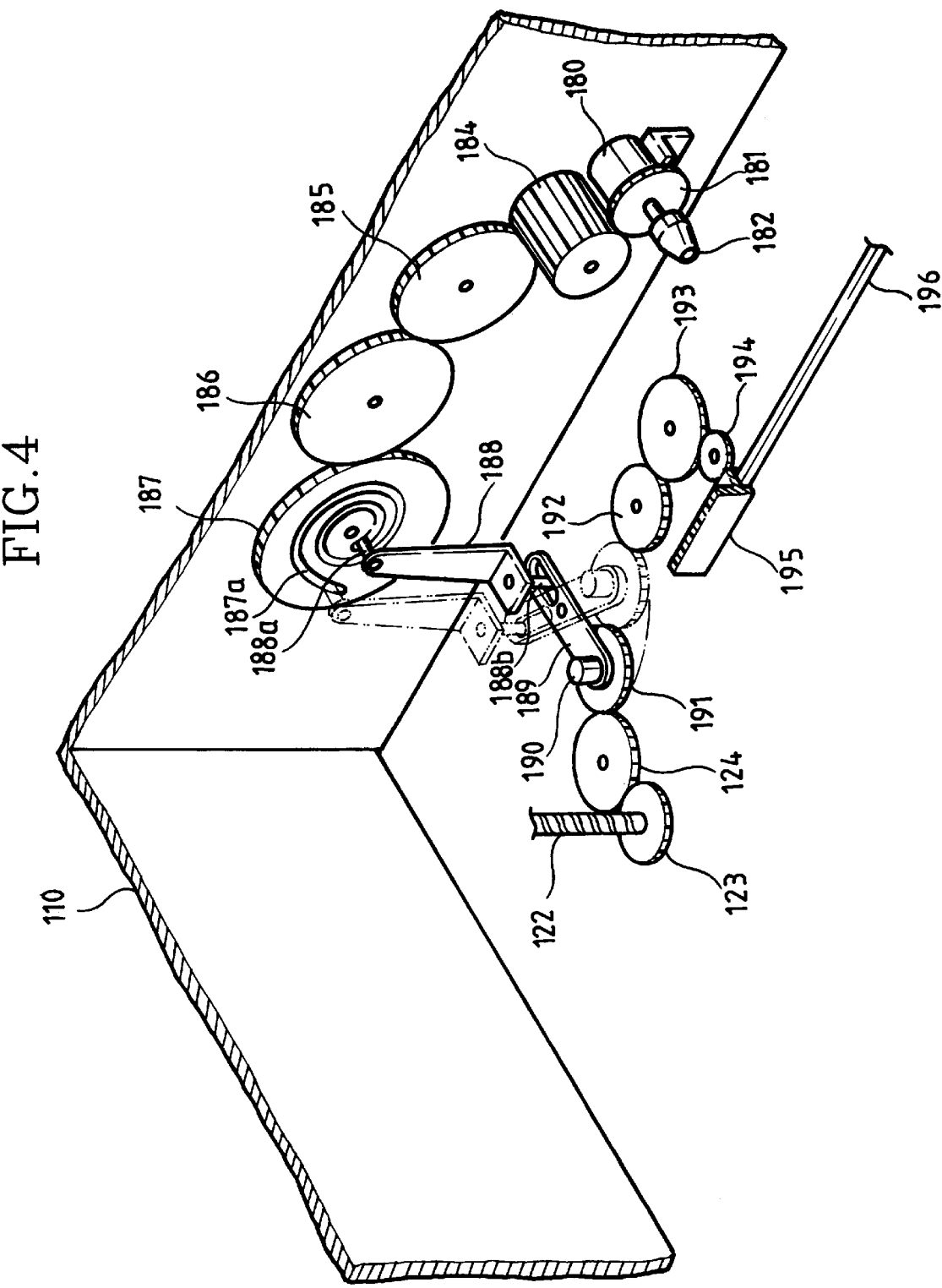
FIG. 4 is a schematic perspective view showing the inside of the housing shown in FIG. 2.

As illustrated in FIG. 4, a tray driving motor 180 is mounted on the inside of a sidewall of the housing 110. A conical friction member 182 is fixed on the output shaft of the tray driving motor 180. The friction member 182 selectively contacts the friction unit 154b of the first rotator 154 or friction unit 164b of the second rotator 164 according to the elevation state of subtray 130.

A driving gear 181 is also disposed on the output shaft of the tray driving motor 180. The driving gear 181 is engaged with a rotation cam plate 187 by a train of gears 184, 185 and 186 interposed therebetween. A cam groove 187a, which spirals outward from a position near the center of rotation cam plate 187 to a periphery thereof, is formed in the rotation cam plate 187. An upper protrusion 188a of a slide member 188, which is movable forward and backward with respect to housing 110, is received in the cam groove 187a. A lower protrusion 188b of the slide member 188 is connected to one end of a rotating member 189 which is rotatably installed on the bottom of the housing 110. A coupling gear 191 is rotatably connected to the other end of the rotating member 189. An elevating motor 190 is connected to the rotating member 189 and drives the coupling gear 191 relative to the rotating member 189. The coupling gear 191 is engaged with a first connecting gear 124 or a second connecting gear 192 depending on the rotational position of the rotating member 189.

The first connecting gear 124 is engaged with a gear 123 fixed at the bottom of the screw stock 122. The first connecting gear 124 is selectively connected to the coupling gear 191 by the tray driving motor 180, and the screw stock 122 engaged with the first connecting gear 124 by the gear 123, constitute magazine elevating means for elevating the magazine 120 in combination with the elevating motor 190.

The second connecting gear 192 is engaged with a gear 195a (see FIG. 8) of a rack member 195 by a train of gears 193 and 194 interposed therebetween. The rack member 195 is slidably mounted for forward and backward movement with respect to the housing 110 along a rail 196 installed at the bottom of the housing 110. A protrusion 195b is formed on one side of the rack member 195. The protrusion 195b is slidably received in a diagonal cam groove 132 formed in the sidewall of the subtray 130. This allows subtray 130 to move up and down as the rack member 195 moves forward and backward. The rack member 195 having the aforementioned configuration constitutes a subtray elevating means in combination with the coupling gear 191 and elevating motor 190.

Figure 2:
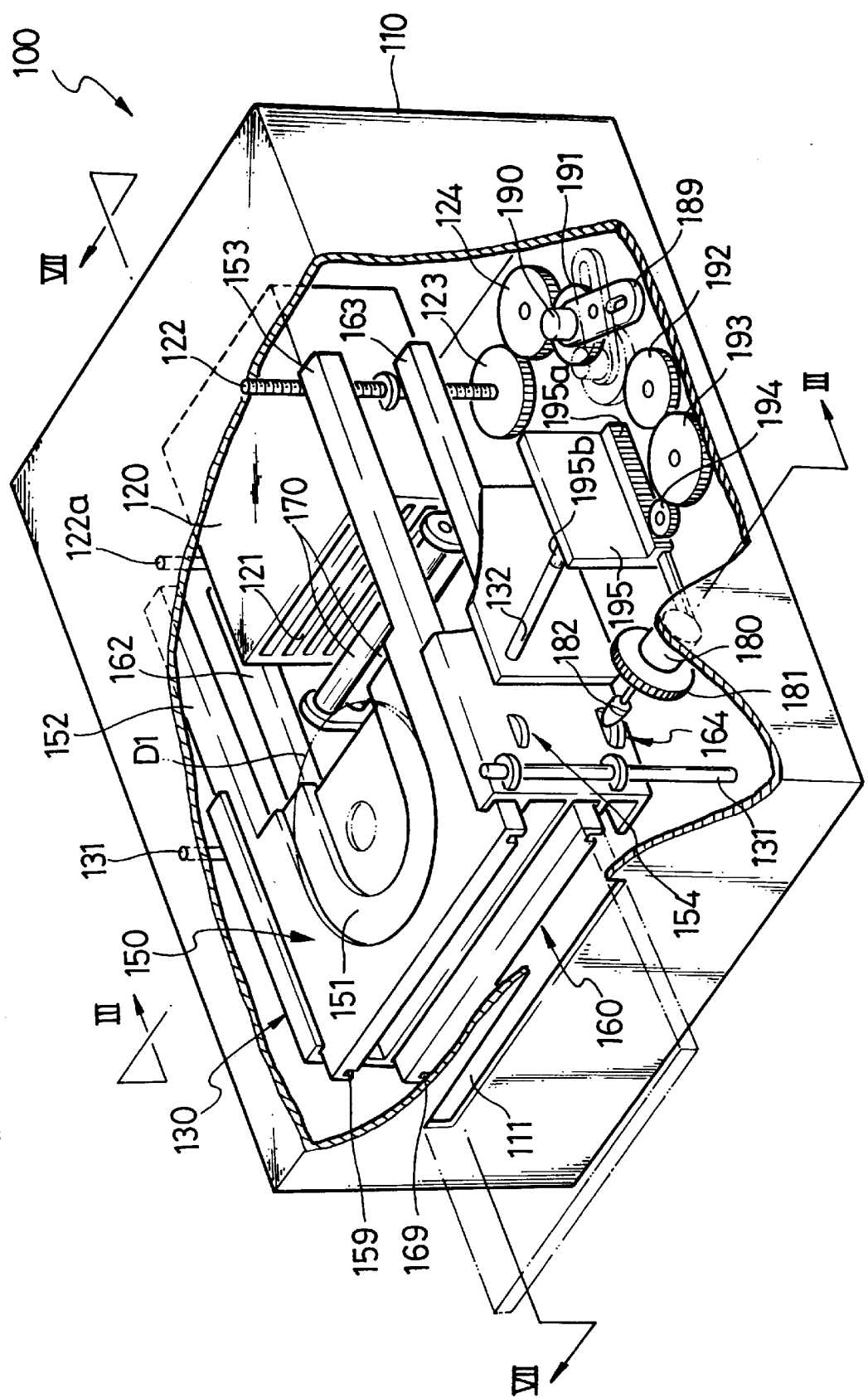
FIG. 2 is a schematic perspective view of a disk recording/reproducing apparatus according to a preferred embodiment of the present invention.

As illustrated in FIG. 2, a pair of rollers 170 are installed between the subtray 130 and the magazine 120, are spaced apart by a predetermined distance, and extend in parallel to one another. The rollers 170 constitute disk transferring means for transferring a disk from the magazine 120 to the disk seating unit 151/161 of either the first tray 150 or the second tray 160, whichever is positioned at the height of the disk entrance 111 of the housing 110, or to place a disk seated on the disk seating unit 151/161 of the tray into the magazine 120. If the rollers 170 rotate after the disk is inserted therebetween, the disk is pressingly transferred from the subtray 130 to the magazine 120 by the friction force of the rollers 170, or from the magazine 120 to the subtray 130, depending on the direction of rotation of the rollers 170.

In the raised state of subtray 130, the first and second trays 150 and 160 are supported at a first position where the disks D1 and D2 in disk seating units 151 and 161 are spaced apart from the rollers 170 by a predetermined distance. During the lowering of the subtray 130, the disk D2 seated in the disk seating unit 161 of the second tray 160 is placed on and supported by the turntable 141 of the deck 140.

With the subtray 130 in a lowered state, the first tray 150 may be moved horizontally between the first position and a second position where the disk D1 seated in the disk seating unit 151 is inserted between the rollers 170 of the housing 110, by a first tray position changing means having the locking rib 155, the first rotator 154 with the coupling protrusion 154c connected to the locking rib 155 and the tray driving motor 180. The first tray 150 may be locked at the first position or the second position depending on the rotational position of the first rotator 154.

With the subtray 130 in a raised position, the second tray 160 may also be moved horizontally from the first position to a second position where the disk D2 seated in the disk seating unit 161 is inserted between the rollers 170 of the housing 110 forward and backward with respect to the housing 110, or its position can be fixed at the first or second position. A second tray position changing means for horizontally moving second tray 160 between the first position and the second position is constituted of the locking rib 165, the second rotator 164 with the coupling protrusion 164c connected to the locking rib 165 and the tray driving motor 180. The second tray 160 may be locked at the first or second position in a manner similar to the first tray 150.

The operation of the disk recording/reproducing apparatus having the aforementioned configuration will now be described.

First, as shown in FIGS. 3 and 7, if the disk D2 seated in the disk seating unit 161 of the second tray 160 is to be recorded or reproduced, the subtray 130 must be moved to the lowered position. For this purpose, if the tray driving motor 180 is rotated in one direction, the driving gear 181 fixed on the output shaft of the tray driving motor 180 rotates, and the rotation cam plate 187 rotates by the train of gears 184, 185 and 186 connected to the driving gear 181. The slide member 188 whose upper protrusion 188a is locked into the snail cam groove 187a of the rotation cam plate 187 is transferred from the state depicted by the solid line to that depicted by the dashed line in FIG. 4 by the rotation of the rotating cam plate 187. At this time, the rotating member 189 connected to the slide member 188 also rotates in the manner as depicted by the dashed line in FIG. 4, and the coupling gear 191 rotatably connected to the end of the rotating member 189 is engaged with the second connecting gear 192.

Figure 8:
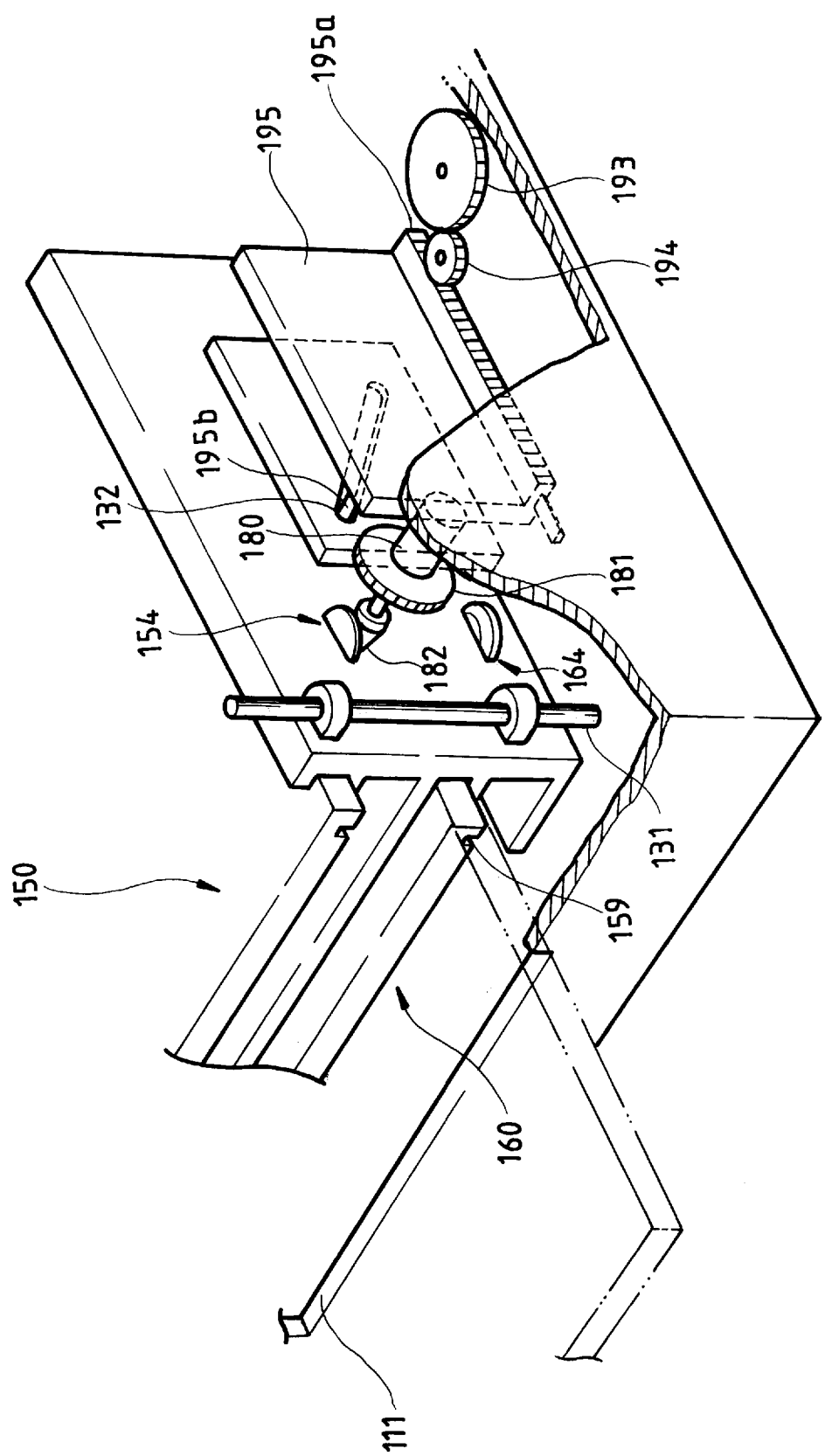
FIG. 8 is a sectional view showing important portions with the subtray in a lowered state.

In such a state, if the elevating motor 190 rotates in one direction to rotate the coupling gear 191, the rotational force is transferred to the rack member 195 via the train of gears 192, 193 and 194, so that the rack member 195 is transferred from the state shown in FIG. 2 to the front of the housing 110 along the rail 196. In response to the movement of the rack member 195, the protrusion 195b of the rack member 195 slides along the diagonal cam groove 132 to lower the subtray 130 as shown in FIGS. 8 through 10.

Figure 9:
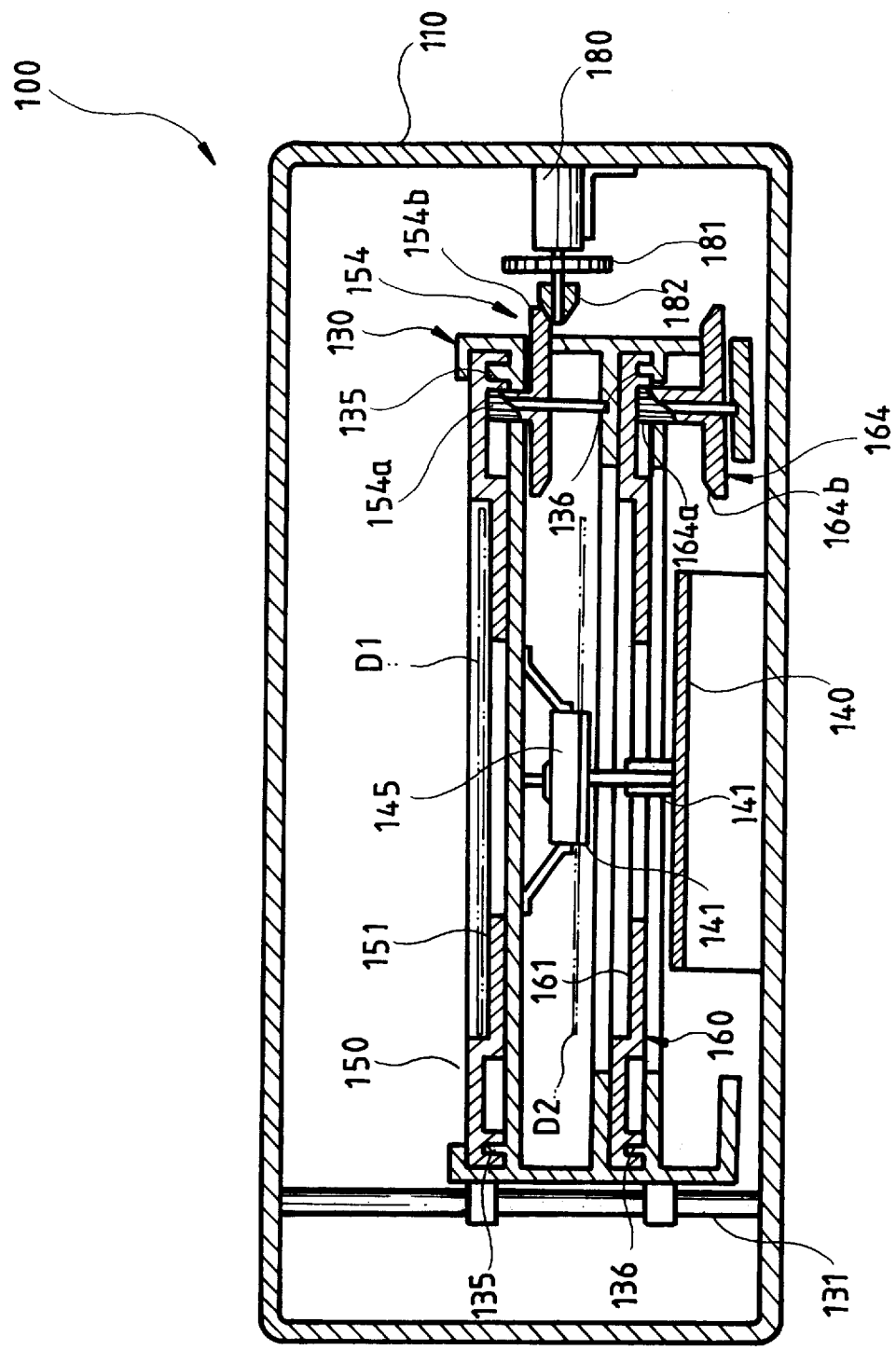
FIG. 9 is a schematic sectional view, as in FIG. 3, with the subtray in its lowered state.
Figure 10:
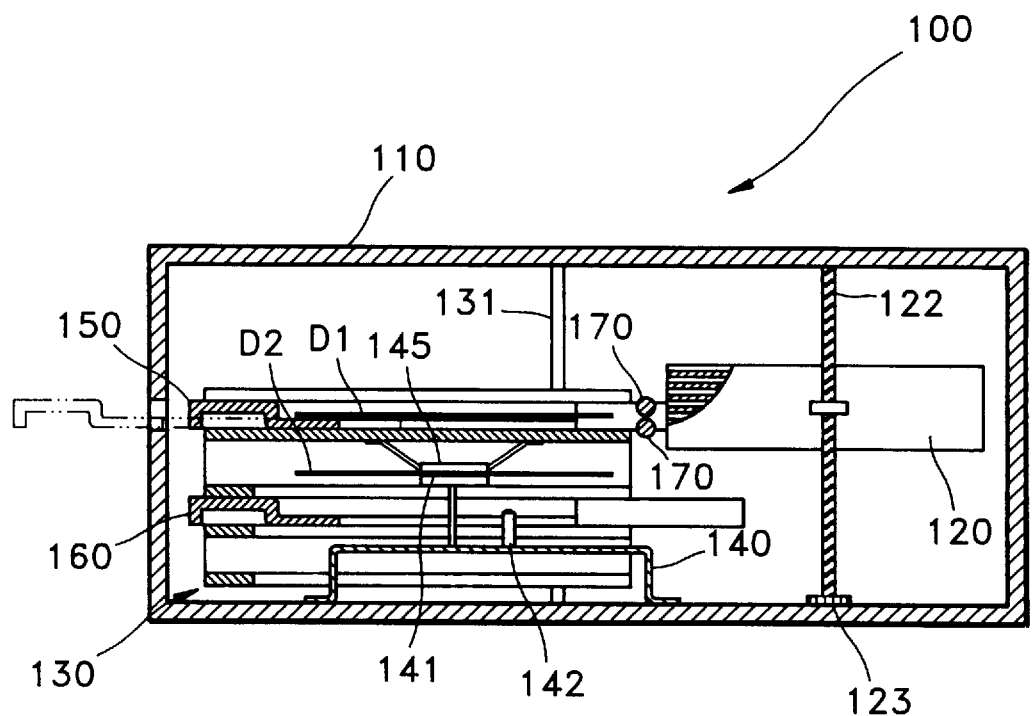
FIG. 10 is a schematic sectional view, as in FIG. 7, with the subtray in its lowered state.

With the subtray 130 in the lowered position shown in FIGS. 9 and 10, the first tray 150 is positioned at the height of the disk entrance 111 of the housing 110 and friction member 182 connected to the output shaft of the tray driving motor 180 makes contact with the friction unit 154*b* of the first rotator 154. At this time, the gear 154*a* of the first rotator 154 is disengaged from the rack 153*a* of the first tray 150, as shown in FIG. 12. The coupling protrusion 154*c* of the first rotator 154 is positioned between the first wall 155*a* and the second wall 155*b* of the locking rib 155. The disk D2 seated in the disk seating unit 161 of the second tray 160 is then transferred to and supported by the turntable 141 of the deck 140. The turntable 141 can be rotated and the optical pickup 142 moved radially along the disk D2 to then record information onto or read information from the disk D2 in a known manner.

Figure 11:
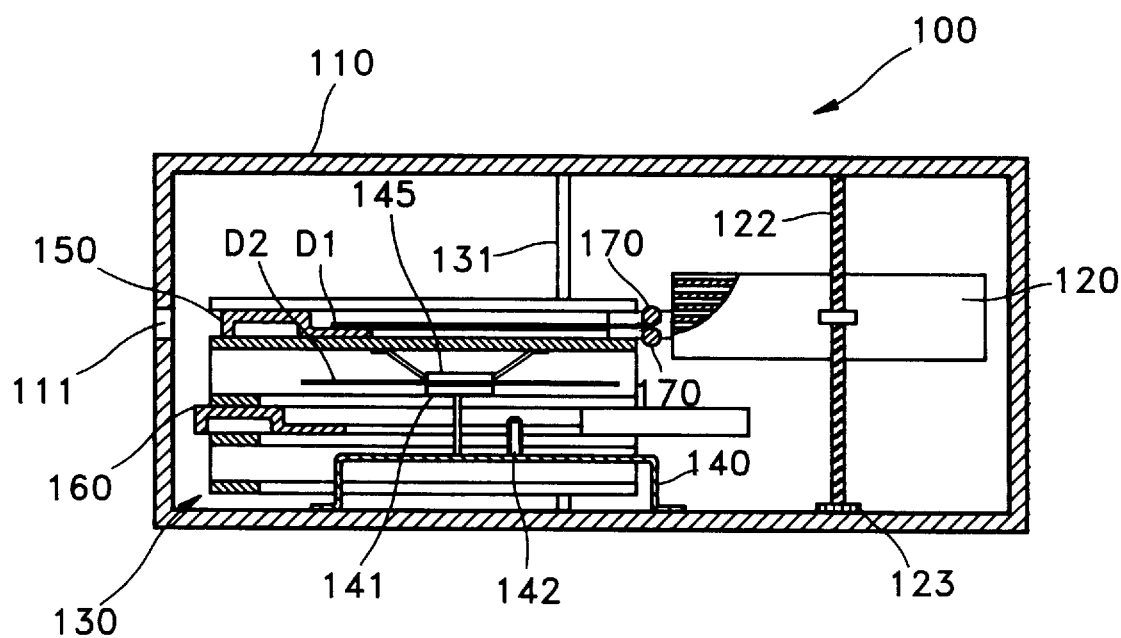
FIG. 11 is a schematic sectional view showing the first tray moved to a second position.

During recording or reproducing of the disk D2, the first tray 150 can be moved between a position where it protrudes outside the housing 110 via the disk entrance 111 as indicated by the dashed line of FIG. 10 and the second position shown in FIG. 11. This movement can be accomplished as follows. First, as shown in FIG. 12, in the state where the first tray 150 is located inside the housing 10 apart from the disk entrance 111 by a constant distance L1, if the tray driving motor 190 is operated so that the first rotator 154 rotates in the direction indicated by arrow A, the friction member 182 fixed on the output end of the tray driving motor 180 also rotates. At this time, the first rotator 154 closely contacting the rotating friction member 182 rotates by the frictional force between the friction unit 154*b* and the friction member 182.

Figure 13:
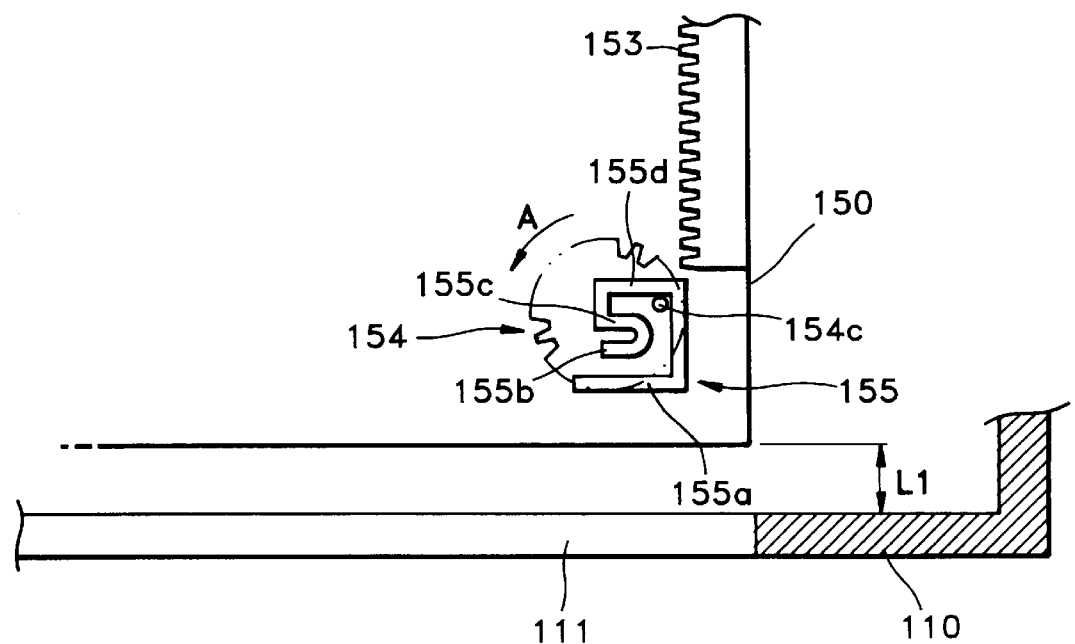
Figure 14:
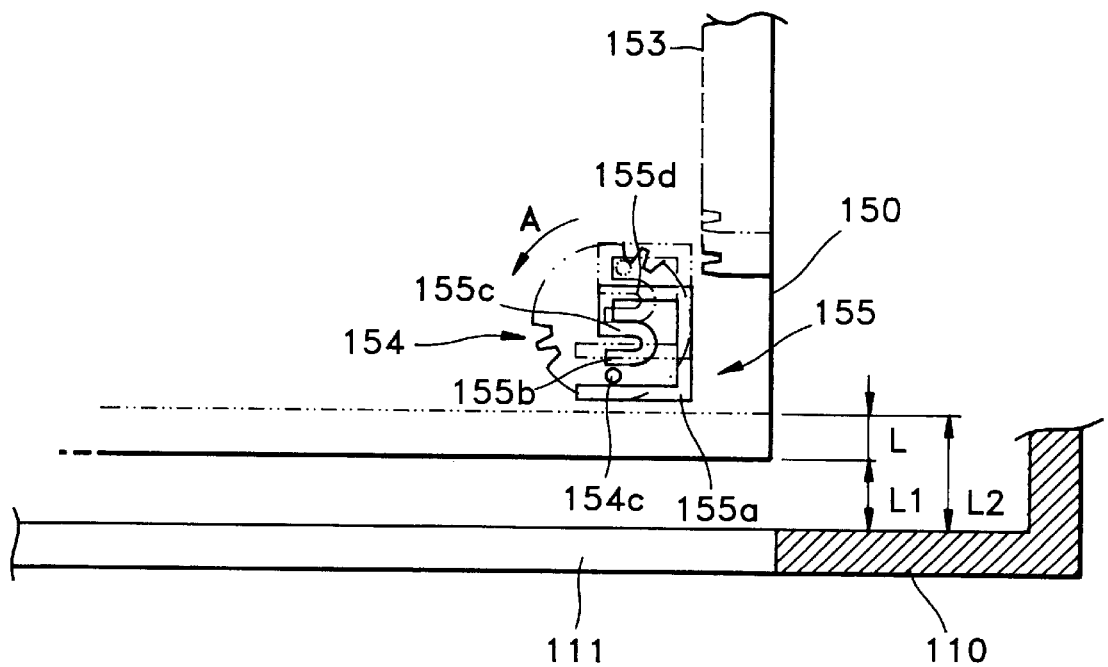

In response to the rotation of the first rotator 154, the coupling protrusion 154*c* of the first rotator 154 which is inserted between the first wall 155*a* and second wall 155*b* in the lower portion of the first tray 150, contacts fourth wall 155*d* while it rotates in the direction of arrow A, as shown in FIG. 13. Then, in response to the continued rotation of the tray driving motor 180, the coupling protrusion 154*c* presses against the fourth wall 155*d* to then move the first tray 150 away from the disk entrance 111 of the housing 110 by a predetermined distance L, as indicated by the dashed line of FIG. 14. Accordingly, the position of the first tray 150 is positioned at the second position where the disk D1 seated in the disk seating unit 151 is inserted between the rollers 170, as shown in FIG. 11.

In the state where the first tray 150 is positioned at the second position, the coupling protrusion 154*c* of the first rotator 150 is inserted between the third wall 155*c* and fourth wall 155*d*. Then first tray 150 is fixed at the second position, with the back and forth movement of the housing 110 being prevented.

With the first tray 150 fixed at the second position as described above, the disk D1 seated on the disk seating unit 151 of the first tray 150 is inserted between the rollers 170. As the rollers 170 rotate, the disk D1 is pressingly transferred toward the magazine 120 by the friction force of the rollers 170 and is received in a disk receiver positioned at the same height as that of the transferred disk among the disk receivers 121 of the magazine 120.

After the magazine 120 is raised or lowered by an elevation process (to be described later), a disk of another disk receiver is extracted by a well-known disk extracting means such as an extracting lever (not shown) installed within the disk receiver, inserted between rollers 170 and then pressingly transferred toward the first tray 150. The disk extracted from the magazine 120 and pressingly transferred by the rollers 170 is seated in the disk seating unit 151. In this way, if the upper disk D1 of the first tray 150 is inserted between the rollers 170 by the movement of the first tray 150 to the second position, the need to install a separate extracting lever for inserting a disk on the tray between the rollers 170 is eliminated. This reduces costs in comparison to the conventional disk recording/reproducing apparatus which does not have a method of moving the tray to the above-described second position.

Figure 15:
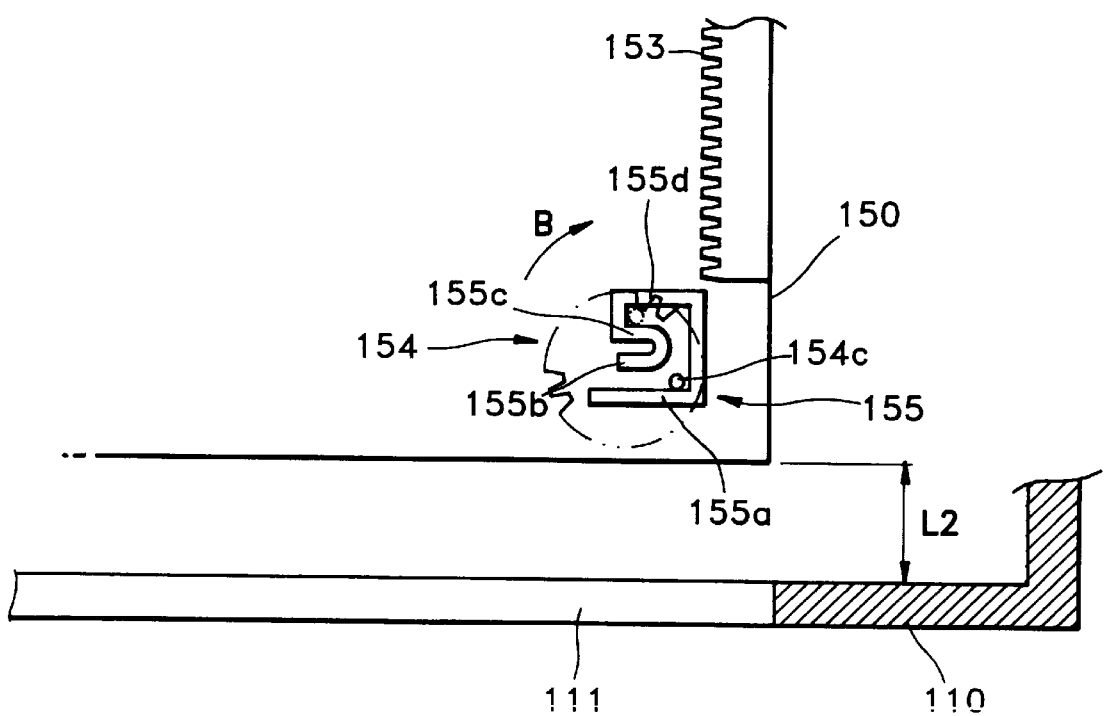
FIGS. 15 and 16 are structural plan views of important portions, sequentially showing the positional relationship between a locking rib of the first tray and a connecting protrusion of the first rotator when the first tray is transferred from the second position to the first position.
Figure 16:
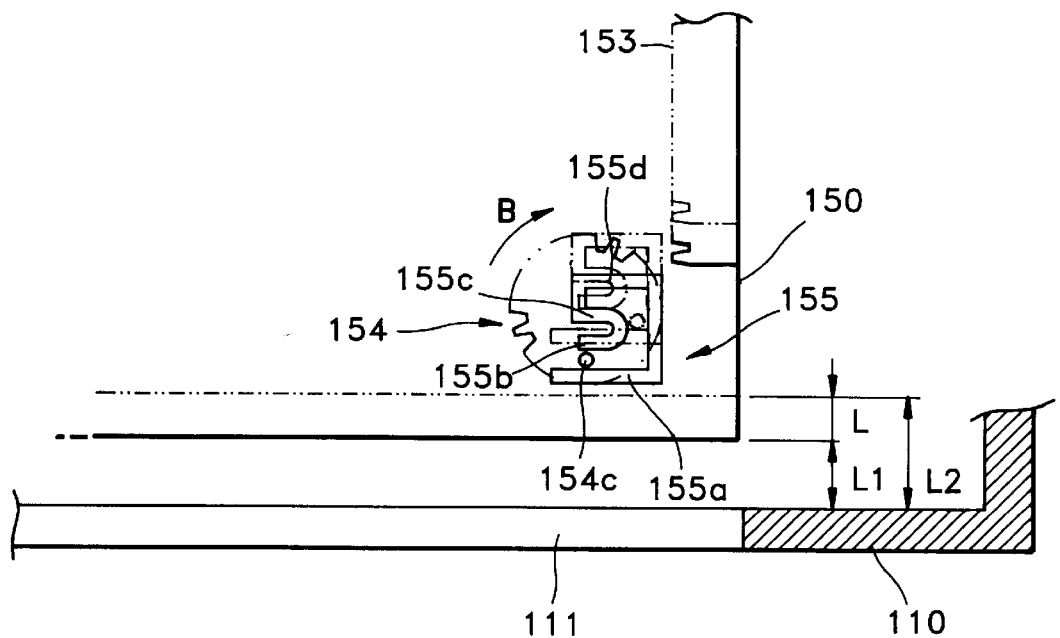

The first tray 150, having received a new disk from the magazine 120 by the rollers 170 at the second position, moves back to the first position by the rotation of the coupling protrusion 154*c* of the first rotator 154 within the locking rib 155 in the lower portion of the first tray 150. In other words, as depicted by the dashed line of FIG. 15, in the state where the coupling protrusion 154*c* of the first rotator 154 is inserted between the third wall 155*c* and fourth wall 155*d* of the first tray 150 to fix the first tray 150 at the second position, the tray driving motor 180 operates so that the first rotator 154 rotates in the direction of arrow B. Accordingly, the coupling protrusion 154*c* rotates in the direction of arrow B and then makes contact with the first wall 155*a*, as depicted by the solid line of FIG. 15. The continued rotation of the first rotator 154 causes the coupling protrusion 154*c* to press against the first wall 155*a* and reaches a position between the first wall 155*a* and second wall 155*b*, as depicted by the solid line of FIG. 16. In the course of such operation, the first tray 150 is moved toward the disk entrance 111 of the housing 110 a predetermined distance L.

Figure 17:
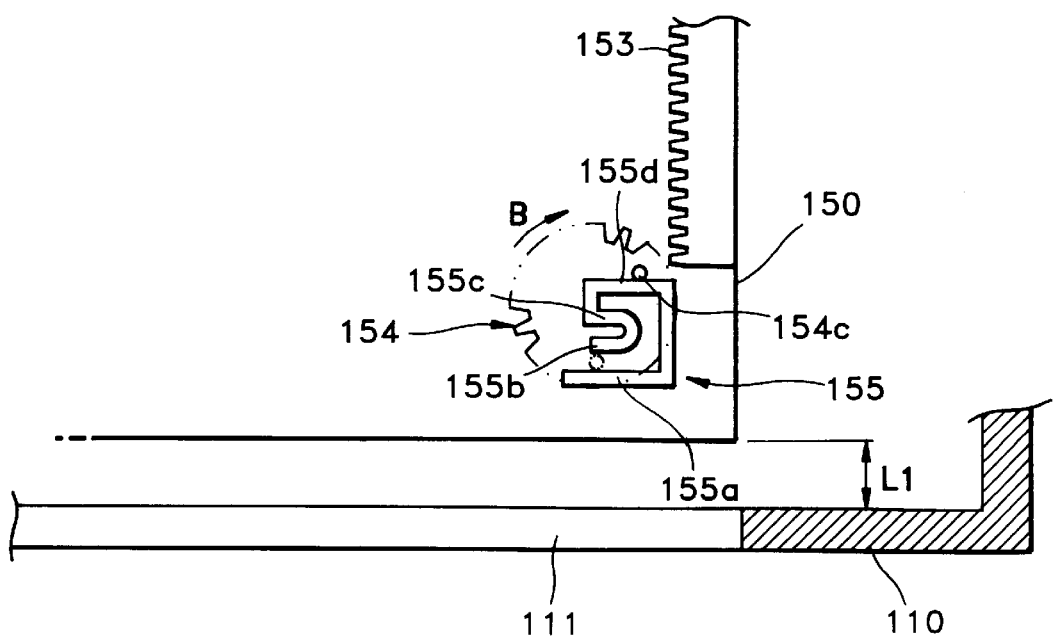
FIGS. 17 through 19 are structural plan views of important portions, sequentially showing the positional relationship between a locking rib of the first tray and a connecting protrusion of the first rotator when the first tray is transferred from the first position to the position where the first tray is projected to the outside of the housing via an opening of the housing.
Figure 18:
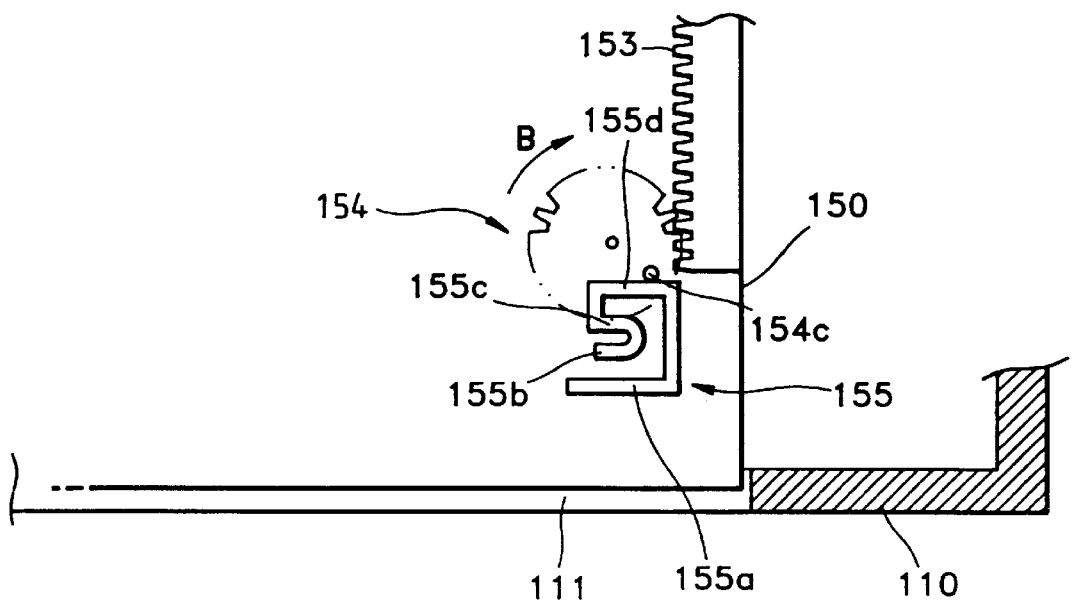
Figure 19:
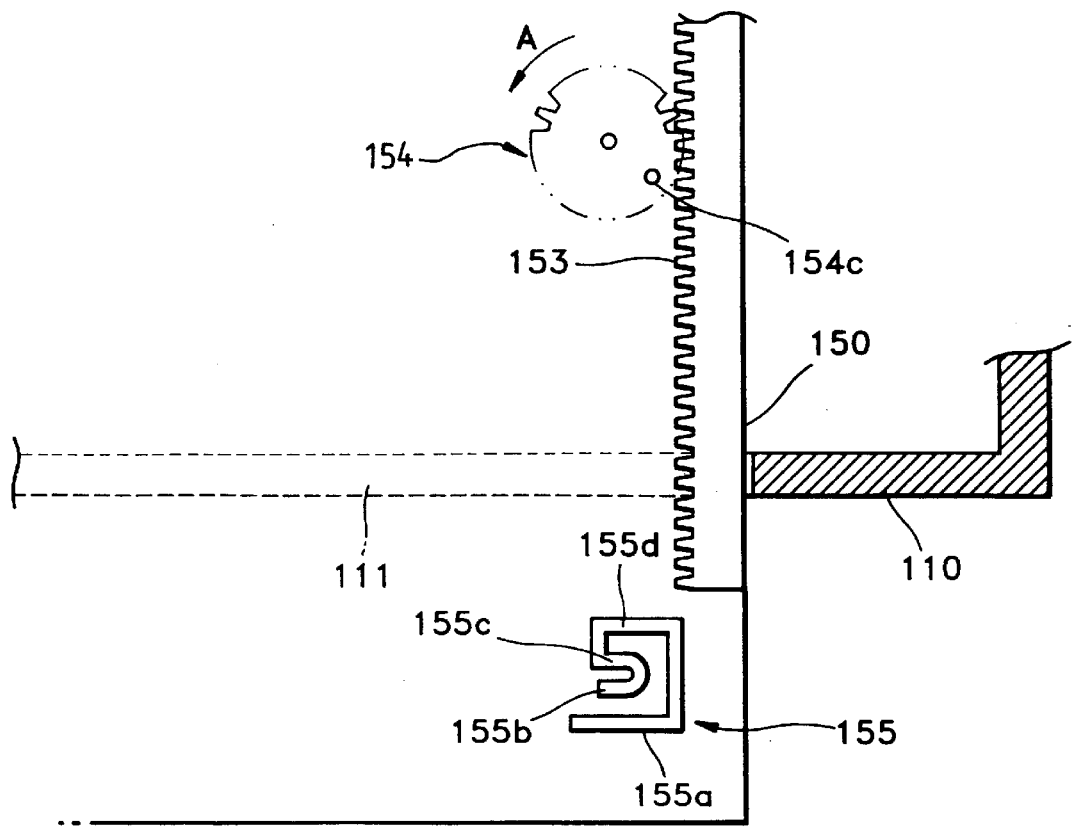

If the rotation of the tray driving motor 180 stops here, the rotation of the first rotator 154 and coupling protrusion 154*c* thereof also stop. Thus, the first tray 150 can be fixed at the first position by the coupling protrusion 154*c* inserted between the first wall 155*a* and second wall 155*b*. If the driving motor 180 continues to rotate from the position of the coupling protrusion 154*c* being between the first wall 155*a* and second wall 155*b*, the coupling protrusion 154*c* also continues to rotate in the direction of arrow B to exit the locking rib 155 and makes contact with the outside of the fourth wall 155*d* of the locking rib 155, as depicted by the solid line of FIG. 17. Then, the coupling protrusion 154*c* presses against the fourth wall 155*d* and moves the first tray 150 forward toward the disk entrance 111 of the housing 110, as shown in FIG. 18. In the course of the forward movement of the first tray 150, the gear 154*a* of the first rotator 154 engages with the rack 153*a* of the first tray 150 and as the tray driving motor 180 continues to rotate, the first rotator 154 continues to rotate by the friction force between the friction unit 154*b* and friction member 182. Accordingly, the first tray 150 continues to move toward, and eventually through, the disk entrance 111 by the gear 154*a* and rack 153*a*, as shown in FIG. 19. With the first tray 150 protruding out of the housing 110, the disk seated in disk seating unit 151 can be replaced by a new disk.

Figure 20:
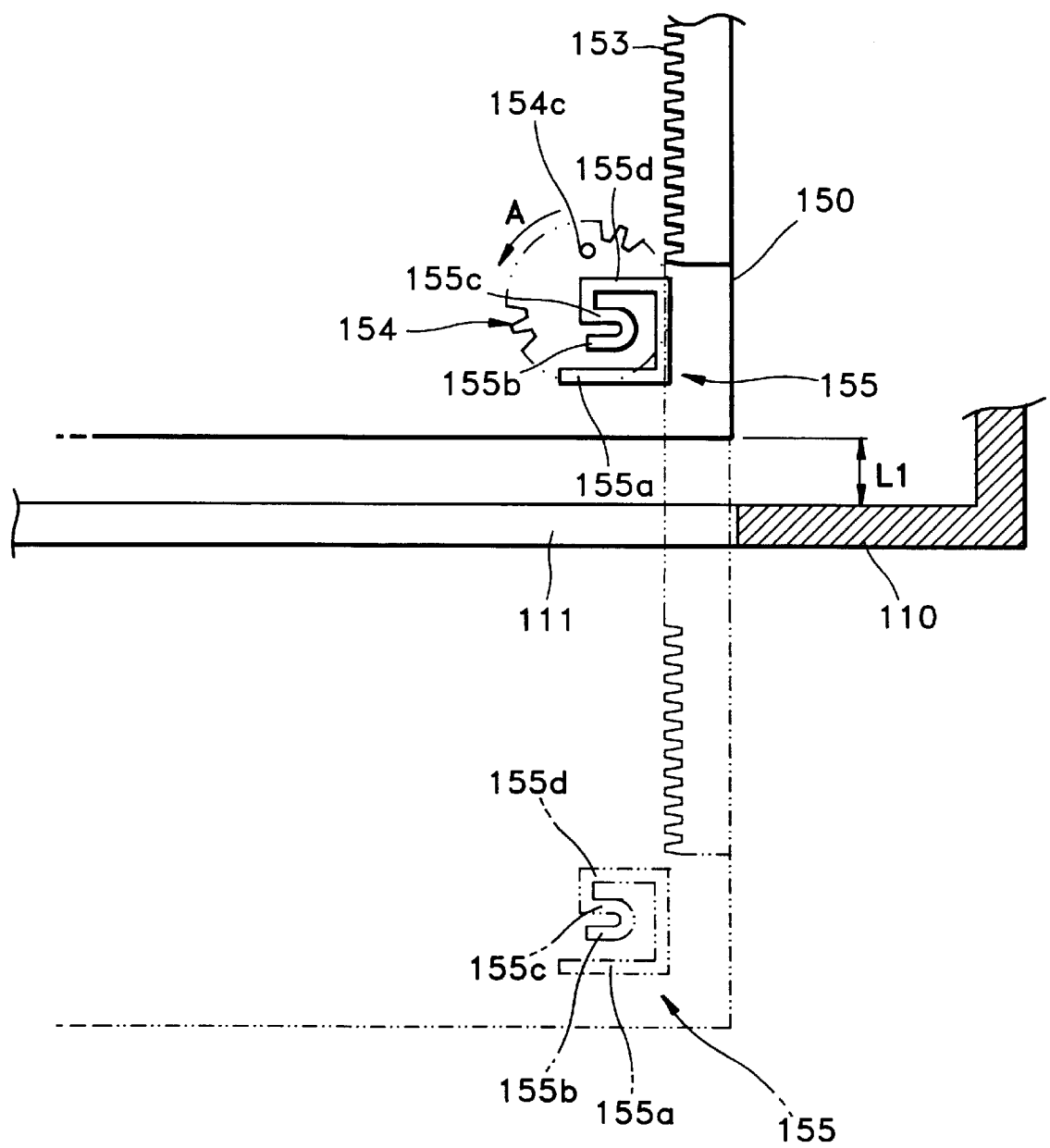
FIG. 20 is a structural plan view of important portions, showing the positional relationship between a locking rib of the first tray and a connecting protrusion of the first rotator when the first tray projected to the outside of the housing is moved back inside of the housing.

Thereafter, if tray driving motor 180 is rotated in the reverse direction, the first rotator 154 rotates in the direction of arrow A by the friction force between the friction member 182 and friction unit 154*b* of the first rotator 154. The first tray 150 having the rack 153*a* coupled to the gear 154*a* of the first rotator 154 is again moved back inside the housing 110 until the teeth of the gear 154*a* of the first rotator 154 and rack 153*a* of the first tray 150 are no longer engaged, thereby positioning the first tray 150 at the first position, as depicted by the solid line of FIG. 20.

Then, the tray driving motor 180 rotates until the protrusion 154*c* of the first rotator 154 is inserted between the first wall 155a and second wall 155b of the first tray 150 by being rotated in the direction of arrow A, as shown in FIG. 12. In the course of such operations, since the teeth of the gear 154a of first rotator 154 and rack 153a of first tray 150 are no longer engaged, the first tray 150 remains at the first position. If the rotation of the tray driving motor 180 stops when the protrusion 154c is inserted between the first wall 155a and second wall 155b, the first tray 150 will be fixed at the first position in spite of any external force applied to the first tray 150, the backward and forward movement of the first tray 150 being prevented by the walls of the locking rib 155.

Through the above-described procedure, a disk replacing operation, such that a disk stored in the magazine can be extracted and replaced by a new disk to be loaded in the disk receiver 121 within the magazine 120, can be accomplished while another disk is recorded on or reproduced from.

The raising and lowering operation of the magazine 120 will now be described in this embodiment. First, the tray driving motor 180 is rotated in reverse to elevate the subtray 130. At this time, the rotational force of the tray driving motor 180 is transferred to the rotation cam plate 187 via the driving gear 181 and the train of gears 184, 185 and 186, and the slide member 188 is moved by the upper protrusion 188a inserted into the cam groove 187a of the rotation cam plate 187, as depicted by the solid line of FIG. 4. Accordingly, the rotating member 189 moves in the state depicted by the solid line of FIG. 4, as opposed to the operation of elevating the subtray 130, and the coupling gear 191 rotatably connected to the end of the rotation member 189 is engaged with the first connecting gear 124, as depicted by the solid line of FIG. 4.

Then, when the elevating motor 190 coupled to the rotation member 189 is rotated to rotate the coupling gear 191, the first connecting gear 124 and gear 123 connected thereto rotate and the screw stock 122 fixed on the gear 123 also rotates. The magazine 120 threadably engaged to the screw stock 122 is raised or lowered along the guide stock 122a according to the rotating direction of the screw stock 122, i.e., the rotating direction of elevating the motor 190.

As described above, while the disk D2 seated in the disk seating unit 161 of the second tray 160 is recorded on or reproduced from, the first tray 150 reciprocally moves between the first position and the second position or between the first position and the ejected position of the first tray 150 according to the rotation of the tray elevating motor 180. Thus, during disk recording or reproduction, the replacement of a disk within the magazine 120 can be performed, that is, a disk accommodated in a predetermined disk receiver among the disk receivers 121 within the magazine 120 can be extracted and replaced by a new disk in the predetermined disk receiver.

If another disk within the magazine 120 is to be reproduced or recorded after the completion of the disk reproduction or recording, the disk D2 seated in the second tray 160 must be replaced with the other disk to be reproduced or recorded. For this purpose, tray driving motor 180 is operated to connect coupling gear 191 coupled to rotating member 189 with the second connecting gear 192 to then reverse the rotating direction of the elevating motor 190 for elevating the subtray 130. Then, the rack member 195 returns to the back of the housing 110 through the train of the gears 192, 193 and 194 and then the subtray 130 is lifted according to the movement of the rack member 195.

With the subtray 130 lifted, the recorded/reproduced disk D2 on the turntable 141 is seated in the disk seating unit 161 of the second tray 160, as shown in FIGS. 3 and 7, and the second tray 160 at the first position is transferred to the height of the disk entrance 111 of the housing 110. At this time, the friction member 182 coupled to the output shaft of the tray driving motor 180 makes contact with the friction unit 164b of the second rotator 164. In such a state, if the tray driving motor 180 is rotated, the second rotator 164 rotates by the frictional force between the friction member 182 of the tray driving motor 180 and friction unit 164b of the second rotator 164.

Figure 21:
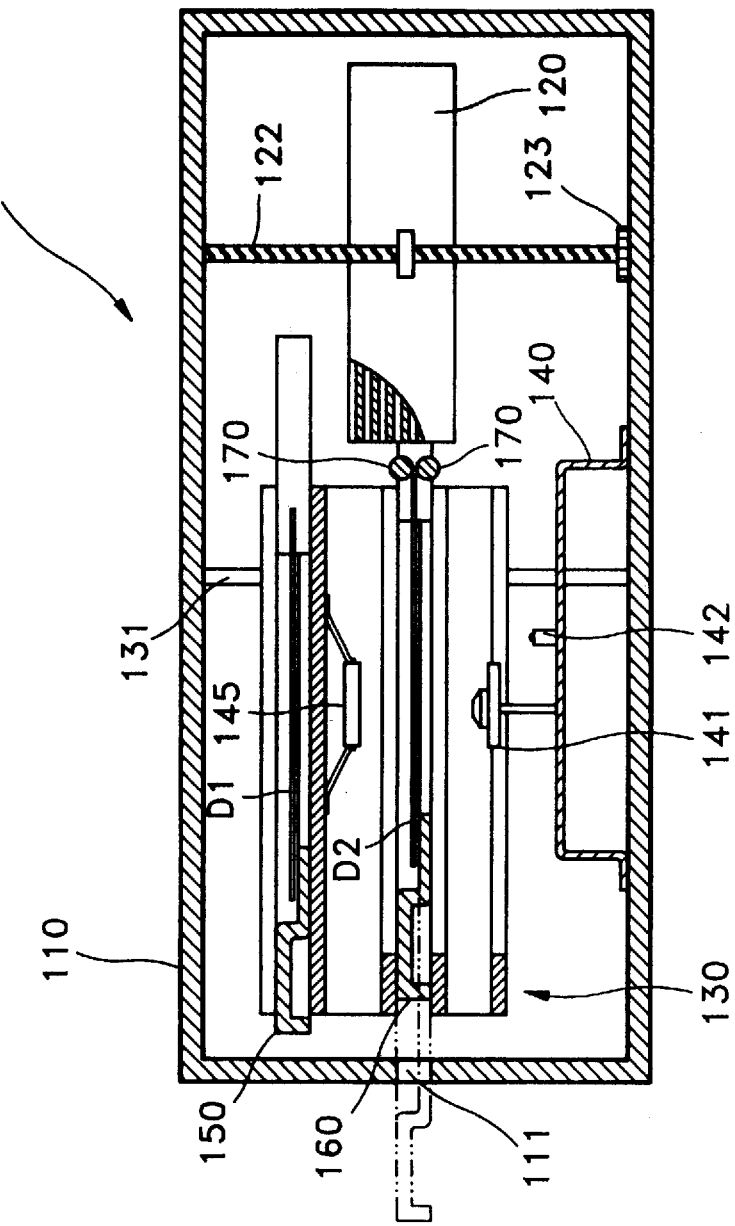
FIG. 21 is a schematic sectional view showing the second tray moved to the second position.

In the raised state of the subtray 130, the second tray 160 is moved to the second position where the disk D2 seated in disk seating unit 161 is inserted between the rollers 170, as depicted by the solid line of FIG. 21. Here, since the second tray 160 has the locking rib 165 having the same configuration as that of the locking rib 155 of the first tray 150 and the coupling protrusion 164c having the same configuration as that of the coupling protrusion 154c of the first rotator 154, as described earlier, the second tray 160 can be moved to the second position in the same manner as that of the first tray 150.

Since the disk D2 of the second tray 160 which is moved to the second position is inserted between the rollers 170, a new disk accommodated within the magazine 120 can be seated in the disk seating unit 161 of the second tray 160 in the same manner as the disk changing process of the first tray 150, thereby completing the disk changing operation.

After the operation of changing disks of the second tray 160 is completed, second tray 160 returns to the first position. In such a state, if the subtray 130 is lowered, the new disk is supported on the turntable 141 to be reproduced from or recorded on.

As described above, the second tray 160 includes the rack 163a having the same configuration as that of the rack 153a of the first tray 150 and the second rotator 164 having the same configuration as that of the first rotator 154. Also, the gear 164a of the second rotator 164 is engaged with the rack 163a of the second tray 160. Thus, in the raised state of the subtray 130, the second tray 160 may protrude to the outside of the housing 110 via the disk entrance 111 by the rotation of the tray driving motor 180 and a frictional force between the friction unit 164b of the second rotator 164 and the friction member 182, as depicted by the dashed line of FIG. 21. Therefore, when a disk is not being recorded on or reproduced from, a disk accommodated in any disk receiver among the disk receivers 121 of the magazine 120 can be replaced with a new one by the second tray 160.

In the above-described embodiment, according to the rotating direction of the tray driving motor 180, the coupling gear 191 rotatably coupled to the rotating member 189 is connected with the first connecting gear 124 or the second connecting gear 192 and the elevating motor 190 installed in the rotating member 189 is rotated to selectively elevate the subtray 130 or the magazine 120.

Figure 22:
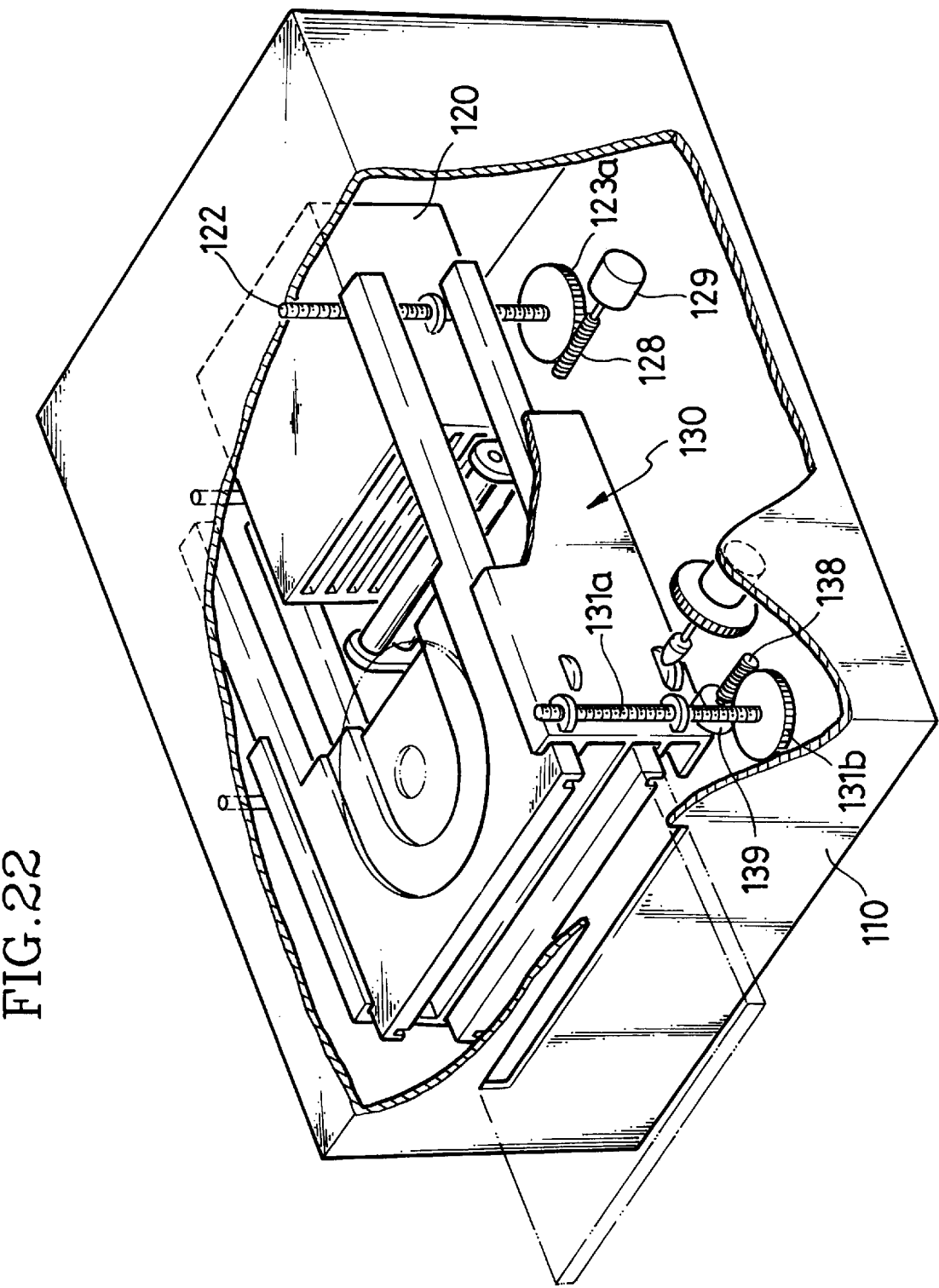
FIG. 22 is a structural plan view of a second preferred embodiment of the present invention.

However, in a second embodiment illustrated in FIG. 22, the magazine 120 and the subtray 130 may be lifted independently. For instance, means for elevating the subtray 130 and means for elevating the magazine 120 may be constructed separately, as shown in FIG. 22. In other words, the magazine elevating means is comprised of a first worm gear 123a fixed to the screw stock 122 and a first motor 129 fixed on the housing 110 and having a first worm 128 coupled to the first worm gear 123a at its output shaft. The subtray elevating means is comprised of an auxiliary screw stock 131a rotatably coupled to the housing 110 and screw-coupled to the subtray 130, a second worm gear 131b fixed to the auxiliary screw stock 131a and a second motor 139 fixed on the housing 110 and having a second worm 138 coupled to the second worm gear 131b at its output shaft.

In the second embodiment, when the first motor 129 rotates, the rotation force is transmitted to the screw stock 122 via the first worm 128 and the first worm gear 123a coupled thereto to rotate the screw stock 122, thereby lifting or lowering the subtray 130. Also, when the second motor 139 rotates, the rotation force is transmitted to the auxiliary screw stock 131a via the second worm 138 and second worm gear 131b coupled thereto to rotate the auxiliary screw stock 131a, thereby raising or lowering the subtray 130. Accordingly, the subtray 130 and the magazine 120 can be raised or lowered independently.

Figure 23:
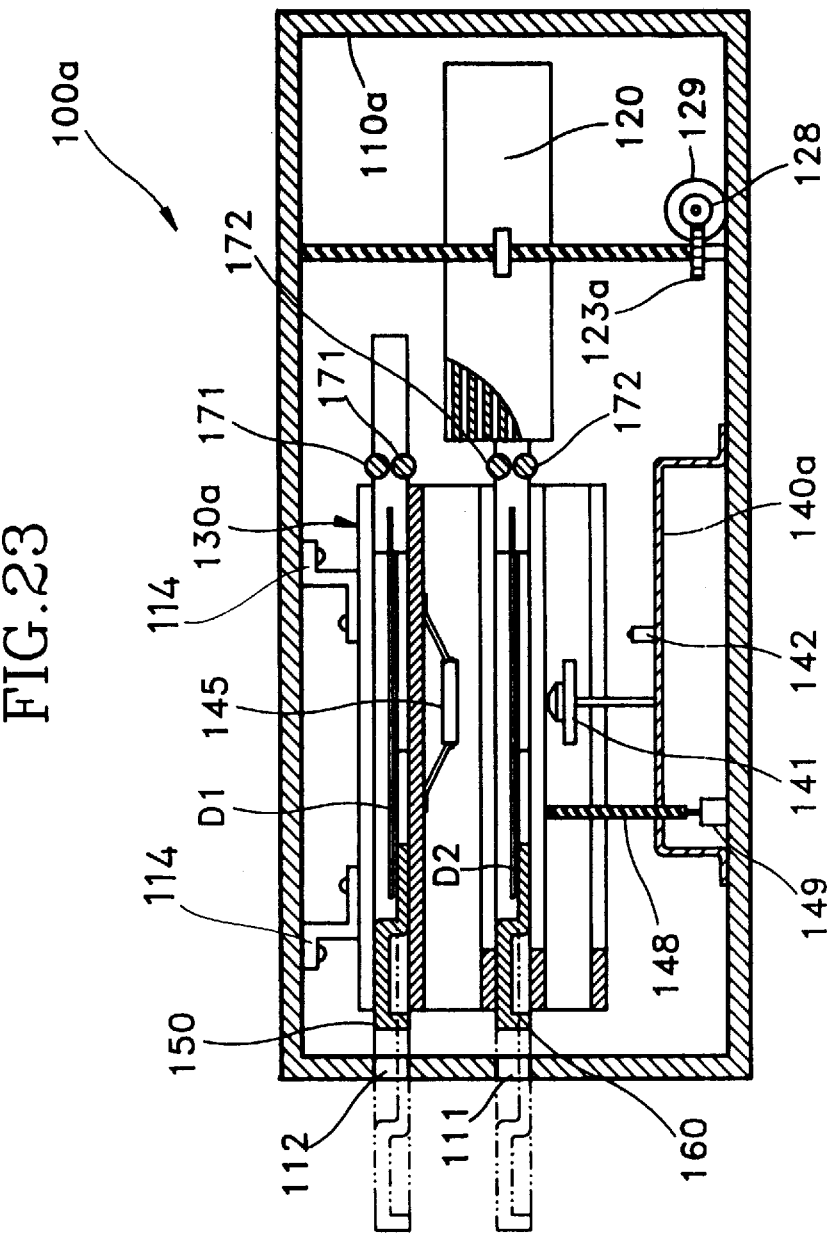
FIG. 23 is a sectional view of a third preferred embodiment of the present invention.

A disk recording/reproducing apparatus according to a third embodiment of the present invention is schematically shown in FIGS. 23 and 24. As shown in FIGS. 23 and 24, in a disk recording/reproducing apparatus 100a according to this embodiment, a subtray 130a for supporting the first tray 150 and the second tray 160 for horizontal movement to the front and rear of a housing 110a is fixed to the housing 110a by means of supporting brackets 114. A deck 140a in which a turntable 141 and an optical pickup 142 are installed is elevatably installed in the lower portion of the subtray 130a, by a motor 149 fixed to the bottom of the housing 110a and a screw stock 148 fixed on the output shaft of the motor 149 and screw-coupled to the deck 140a. Thus, the deck 140a approaches the subtray 130a as the deck 140a is lifted.

Disk entrances 111 and 112 are installed at the front wall of the housing 110a at heights corresponding to the first tray 150 and second tray 160, respectively. A pair of rollers 171 and 172 are installed at the rears of the first tray 150 and second tray 160, respectively. The pairs of rollers 171 and 172 have the same structure and function as those of the rollers 170 in the aforementioned embodiments. The magazine 120 for accommodating a plurality of disks is raised or lowered according to the rotation of the screw stock 122 via a worm 128 fixed on the output shaft of the motor 129 and a worm gear 123a coupled thereto, similar to the embodiment shown in FIG. 22.

In the disk recording/reproducing apparatus 100a having the aforementioned configuration, the first tray 150 and second tray 160 are inserted into or ejected from the corresponding disk entrances 111 and 112 by a proper driving source (not shown) when the deck 140a is in a lowered state, as shown in FIG. 23. The first tray 150 may be moved to the second position where the disk D1 seated thereon can be inserted between the upper rollers 171 by an appropriate driving means, e.g., the first rotator 154 or the coupling protrusion 155 in the above-described embodiments. Also, the second tray 160 may be moved to a second position where a disk D2 seated thereon can be inserted between the lower rollers 172.

As shown in FIG. 24, with the deck 140a raised by the rotation of the motor 149, the turntable 141 protrudes above the second tray 160 to pick up and support the disk D2 seated on the disk seating unit 161. While the turntable 141 rotates and an optical pickup 142 moves radially along the disk D2, information is recorded or reproduced. In this manner, even during recording/reproduction of a disk, disks in the magazine can be replaced by the same procedure as the disk exchanging procedure in the first and second embodiments, by the first tray 150 moving forward and backward with respect to the housing 110a from a position outside the housing 110a and a position at the upper rollers 171.

In the disk recording/reproducing apparatus 100 described with reference to FIG. 2, the rack 153a of the first tray 150 extends from the end of the guide 153 adjacent to the portion where the locking rib 155 is formed. When the first rotator 154 rotates, the first tray 150 is inserted into or extracted from the disk entrance 111 of the housing 110 and is movable to the second position by the engagement of the rack 153a with the gear 154a and the engagement of the locking rib 155 with the coupling protrusion 154c. Instead, the rack 153a beneath first tray 150 may be further extended to the front of the first tray 150 with only the gear 154a of the first rotator 154 engaged with the rack 153a of the first tray 150 without the engagement of the locking rib 155 with the coupling protrusion 154c, to then be moved to the second position and the position where the first tray 150 protrudes out of the disk entrance 111.

Also, the second tray 160 may be moved to the second position and the position where the second tray 160 protrudes out of the disk entrance 111 only through the engagement of the gear 164a of the second rotator 164 with the rack 163a of the second tray 160 by further extending the rack 163a beneath the second tray 160 to the front of the second tray 160, without the need for the coupling protrusion 164c of the second rotator 164 and locking rib 165 beneath the second tray 160.

In the embodiments described above, the first tray 150 and second tray 160 are movably installed between the first position and the second position, for inserting disks seated on each disk seating unit between the rollers. However, as in conventional apparatuses, with the first and second trays fixed at the first position, a separate extracting lever may be installed between the first and second trays to insert a disk between the rollers.

Also, the second tray 160 may be installed on the subtray so that the second tray 160 does not protrude outside the housing, contrary to the above embodiments. Finally, the operation of the invention can be controlled by known control devices, such as a microprocessor programmed in a desired manner.

Although specific embodiments of the present invention have been described, it will be understood that various modifications may be made without departing from the scope of the present invention as defined by the appended claims.

What is claimed is:

1. A disk/recording reproducing apparatus comprising:
a housing having at least one disk entrance formed in a front wall thereof;
a magazine having a stack of disk receivers, said magazine being installed at a rear of said housing;
means for elevating and lowering said magazine;
a subtray and a deck each installed inside said housing between said disk entrance and said magazine;
means for moving said subtray and deck relatively toward and away from each other;
a first tray, having a first disk seating unit on an upper portion thereof, installed on said subtray;
first tray transferring means for transporting said first tray horizontally forward and backward with respect to said housing;
a first transferring means for placing a disk in said magazine onto said first disk seating unit and moving a disk from said first disk seating unit into said magazine;
a second tray, having a second disk seating unit on an upper portion thereof, supported by said subtray between said deck and said first tray;
a second tray transferring means for placing a disk in said magazine onto said second disk seating unit and moving a disk from said second disk seating unit into said magazine;

a turntable installed on said deck and extending to a position above said second seating unit when said subtray and said deck are moved toward each other by said moving means, so that said turntable raises the disk off of said second disk seating unit; and an optical pickup installed on said deck;

wherein said first tray is positioned at the same height as said disk entrance so as to be insertable into/extractable from said disk entrance by said first tray transferring means while said deck records/reproduces information onto/from a disk on said second tray.

2. A disk/recording reproducing apparatus comprising:

a housing having at least one disk entrance formed in a front wall thereof;

a magazine having a stack of disk receivers, said magazine being installed at a rear of said housing;

means for elevating and lowering said magazine;

a subtray and a deck each installed inside said housing between said disk entrance and said magazine;

means for moving said subtray and deck relatively toward and away from each other;

a first tray, having a first disk seating unit on an upper portion thereof, installed on said subtray;

first tray transferring means for transporting said first tray horizontally forward and backward with respect to said housing;

a first transferring means for placing a disk in said magazine onto said first disk seating unit and moving a disk from said first disk seating unit into said magazine;

a second tray, having a second disk seating unit on an upper portion thereof, supported by said subtray between said deck and said first tray;

a second tray transferring means for placing a disk in said magazine onto said second disk seating unit and moving a disk from said second disk seating unit into said magazine;

a turntable installed on said deck and extending to a position above said second seating unit when said subtray and said deck are moved toward each other by said moving means, so that said turntable raises the disk off of said second disk seating unit; and an optical pickup installed on said deck;

wherein said first tray is positioned at the same height as said disk entrance so as to be insertable into/extractable from said disk entrance by said first tray transferring means while said deck records/reproduces information onto/from a disk on said second tray; and wherein said first transferring means comprises:
    a pair of rollers installed between said magazine and said subtray; and
    a first tray position changing means for horizontally moving said first tray between a first position where a disk on said first disk seating unit is separated from said pair of rollers and a second position where a disk on said first disk seating unit is inserted between said pair of rollers.

3. A disk recording/reproducing apparatus as claimed in claim 2, wherein said first tray position changing means comprises a locking rib formed in said first tray, a first rotator rotatably installed on said subtray and having a coupling protrusion near its edge, and a driving source for rotating said first rotator, said locking rib comprising a first wall and a fourth wall disposed in parallel to each other and spaced apart from the front of said first tray, wherein the distance between said first wall and said fourth wall is smaller than the rotation diameter of said coupling protrusion, and wherein said coupling protrusion is selectively positioned between said first wall and said fourth wall, said first tray moves from said first position to said second position when said coupling protrusion presses against said fourth wall, and said first tray moves from said second position to said first position when said coupling protrusion presses against said first wall.

4. A disk recording/reproducing apparatus as claimed in claim 3, further comprising means for locking the position of said first tray at said first position and said second position.

5. A disk recording/reproducing apparatus as claimed in claim 4, wherein said first tray locking means includes a second wall and a third wall formed between said first wall and said fourth wall in parallel with each other, wherein said coupling protrusion is selectively inserted between said first wall and said second wall to limit the movement of said first tray when said first tray is positioned at said first position, and said coupling protrusion is selectively inserted between said third wall and said fourth wall to limit the movement of said first tray when said first tray is positioned at said second position.

6. A disk recording/reproducing apparatus as claimed in claim 2, further comprising means for locking the position of said first tray at said first position and said second position.

* * * * *